US006339108B1

(12) United States Patent
Wolter et al.

(10) Patent No.: US 6,339,108 B1
(45) Date of Patent: Jan. 15, 2002

(54) OXYGENATOR MEMBRANE

(75) Inventors: Herbert Wolter, Tauberbischofsheim; Thomas Ballweg, Wertheim; Werner Storch, Hochberg, all of (DE)

(73) Assignee: Fraunhofer-Gesellschaft zur Förderung, München (DE)

( * ) Notice: Subject to any disclaimer, the term of this patent is extended or adjusted under 35 U.S.C. 154(b) by 0 days.

(21) Appl. No.: 09/393,655

(22) Filed: Sep. 10, 1999

(30) Foreign Application Priority Data

Sep. 10, 1998 (DE) .......................................... 198 41 439
Jul. 15, 1999 (EP) ............................................. 99113689

(51) Int. Cl.$^7$ .............................................. C03G 77/00
(52) U.S. Cl. ........................ 521/50; 521/142; 521/145; 422/48; 261/101; 261/105; 261/DIG. 28
(58) Field of Search ........................ 261/DIG. 28, 101, 261/105; 521/27, 154, 142, 145; 210/500.27; 422/48

(56) References Cited

U.S. PATENT DOCUMENTS

| 3,969,240 A |   | 7/1976 | Kolobow et al. .......... 210/22 A |
| 4,374,696 A |   | 2/1983 | Schmidt et al. ............. 156/329 |
| 4,401,567 A |   | 8/1983 | Shindo et al. .............. 210/500 |
| 4,446,024 A |   | 5/1984 | Baker et al. .............. 210/500.2 |
| 4,505,985 A | * | 3/1985 | Schmidt et al. ............. 428/447 |

FOREIGN PATENT DOCUMENTS

| CA | 1321451    | 8/1993  |
| DE | 27 58 414  | 7/1979  |
| DE | 27 58 415  | 7/1979  |
| DE | 29 25 969  | 1/1981  |
| DE | 31 29 064  | 2/1983  |
| DE | 38 26 715  | 2/1990  |
| DE | 39 34 267  | 4/1990  |
| DE | 38 35 968  | 6/1990  |
| DE | 40 11 044  | 10/1991 |
| DE | 43 10 733  | 4/1993  |
| DE | 44 16 857  | 5/1994  |
| DE | 44 05 261  | 8/1995  |
| DE | 196 27 198 | 1/1997  |
| DE | 196 27 220 | 1/1997  |
| EP | 0 094 060  | 11/1983 |
| EP | 0 665 049  | 8/1995  |
| EP | 0 668 326  | 8/1995  |

OTHER PUBLICATIONS

Larbot et al., "Silica Membranes by the Sol–Gel Process", J. of Membrane Sci., 44: pp289–303, 1989.
Renate M. de Vos. Henk Verweij, "Improved performance of silica membranes for gas separation", J. of Membrane Sci. 143: pp.37–51, 1998.
Hassan et al., Journal of Membrane Science 104, pp. 27–43, 1995.

* cited by examiner

*Primary Examiner*—James J. Seidleck
*Assistant Examiner*—Melanie D. Bagwell
(74) *Attorney, Agent, or Firm*—Foley & Lardner

(57) ABSTRACT

The invention relates to an oxygenator membrane based on organically modified silicic-acid polycondensates into a process for preparation thereof. The oxygenator membrane is obtainable by processing a viscous to resinous liquid by conventional methods to form a membrane, drying this membrane, if desired, and subjecting it to curing induced thermally and/or radiatively and/or chemically. The viscous to resinous liquid is obtained by hydrolytic polycondensation of one or more compounds of the general formula I and/or II and/or III and/or IV and/or of precondensates derived from these compound by hydrolytic condensation and, if desired, of one or more compounds of the general formula V, and, if desired, by addition of one or more monomers and/or oligomers which are capable of undergoing addition copolymerization and/or (poly)addition reaction and/or of one or more curing catalysts.

23 Claims, No Drawings

OXYGENATOR MEMBRANE

FIELD OF THE INVENTION

The invention relates to an oxygenator membrane based on organically modified silicic-acid polycondensates and to a process for preparation thereof.

BACKGROUND OF THE INVENTION

Oxygenators for human blood are deployed, for example, during cardiac operations and for treatment of reversible pulmonary insufficiency and are intended temporarily to take over the natural function of the lungs. It is necessary to supply the blood sufficiently with oxygen and at the same time to remove the carbon dioxide formed as a result of metabolic processes within the body. The simplest process for oxygen enrichment in the blood uses so-called bubble oxygenators (BOs), which are simple and inexpensive in construction. In the BO, oxygen is blown into the blood, which flows through a column or specially shaped polymer pouch. Gas exchange occurs at the interface between blood and gas. The exchange of gas in this way unfortunately allows direct contact of gas with blood, and can induce thrombi formation. Such thrombi potentially cause embolism and adversely effect blood coagulation. Furthermore, thrombi formation at the interface of the gas bubbles drastically reduces the effective gas exchange surface area. In addition, it is impossible to prevent these microbubbles from entering the circulation. For these reasons, the patient is stressed physiologically. Accordingly, such oxygenators can be deployed only about 1 to 1.5 hours.

To prevent these problems, membrane oxygenators (MOs) are preferred, since they are better able to imitate natural lung function.

In the case of extracorporal membrane oxygenation (EMCO) it is customary to use hydrophobic membranes. A hydrophobic oxygenator is described, for example, in DE 3129064 A1, which proposes the use of hydrophobic membrane materials for oxygenation in the form, for example, of hollow fibers. In this case, blood is passed in an extracorporal circuit on one side of a hydrophobic membrane, while on the other side of the membrane oxygen is supplied in countercurrent, so that $CO_2/O_2$ exchange is able to take place via the pores of the membrane.

Two types of hydrophobic membrane are commonly used: membranes consisting of a material that is hydrophobic per se, for example polypropylene, and membranes with surfaces that have been made hydrophobic with a hydrophobicizing agent, for example a silicone.

Hydrophobic membranes that comprise hydrophobic materials have comparatively large pores of from several 100 to 1000 nm. The membranes generally are in the form of several 1000 hollow filaments, resulting in an active surface area of up to 6 $m^2$. In this case the blood flows either in the hollow filaments or else on the outside of the hollow filament, whereas the gas to be exchanged is passed by countercurrent on the opposite side. These membranes are commonly used in heart lung machines.

Hydrophobicized membranes consist of a thin layer of silicone on a porous support structure and are used for long-term EMCO treatment. Although hydrophobic membranes are more effective than siliconized membranes, since the diffusion through pores is more rapid, membranes comprising hydrophobic porous material have a significant disadvantage for long-term therapy. This disadvantage consists in the leakage of the membranes. Despite their hydrophobic structure the membrane pores fill with aqueous plasma constituents, leading to hydrophilicization or wetting of the membrane surface.

Prior art membrane material used for hollow fiber oxygenators generally is microporous polypropylene, and, in some cases polyethylene. Hollow polypropylene fibers having a defined, interconnecting porosity are obtained directly only by highly complex spinning processes (e.g., solution wet spinning) or by subsequent and thus additional process steps. When hollow fibers modified in this way are used for gas exchange, a risk exists for passage of the fluid phase. In the case of $O_2/CO_2$ exchange in blood by an oxygenator, such pores are considerably hazardous. Under prolonged use, passage of blood through pores is a frequent complication. In addition, small gas bubbles can pass to the opposite side in such materials, forming microthrombi.

Very high gas permeation rates without pores are realizable only with highly specific polymer materials such as certain silicones or substituted polysilylpropynes. The high gas permeability is achieved, however, at the expense of extreme reduction in mechanical properties of the material. As permeability increases strength and modulus of elasticity decrease, i.e., the material becomes increasingly softer. Consequently, hollow fibers that combine sufficient mechanical stability with very low wall thickness and high gas permeability are not possible. Very different types of polymer are needed in combination with different production techniques in order to make suitable hollow fibers that have suitable permeability over a wide range.

SUMMARY OF THE INVENTION

It is an object of the present invention to provide membranes for oxygenators, having permeability and flexibility that can be varied over a wide range and can be adapted to the requirements of a particular application. Another object is to provide membranes that should combine high mechanical stability with high gas permeability without risking passage of fluid phase. Another object is to provide membrane having high gas permeation values and which are self-supporting and toxicologically acceptable.

It is a further object of the present invention to provide a process to manufacture membranes for oxygenators having properties that can be varied over wide ranges. By simple variation of the process steps it should be possible to adapt the chemical and physical properties of the membrane, within wide ranges, to the requirements of the particular application. The process should be simple, rapid and inexpensive to carry out. By means of the process it should be possible to manufacture membranes which meet the above-mentioned requirements. Furthermore, the process should also be suitable for the continuous production of hollow fiber membranes and flat membranes. In addition, the surface modifications which are often necessary for various applications, for example, in order to avoid blood coagulation, in order to adjust the polarity, adsorption characteristics, etc., should be realizable both during the synthesis of the material, i.e., in situ, and also subsequently.

These objects are achieved by oxygenator membranes which are obtainable by processing a more or less viscous liquid or resin in accordance with conventional methods to form membranes, and, if desired, drying said membranes. The resultant membranes are then cured with thermal and/or radiation-induced and/or chemical induction.

One embodiment of the invention provides a process for producing an oxygenator membrane, comprising forming a membrane from a low-viscosity to resinous liquid produced by hydrolytic polycondensation of a material comprising at least one compound selected from the group consisting of:
a compound of formula I

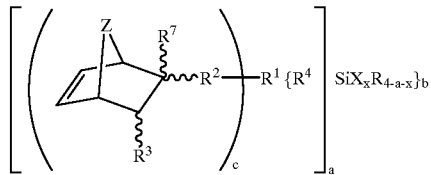

(I)

wherein
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
$R^1$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino,
$R^2$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino,
$R^3$=hydrogen, $R^2$—$R^1$—$R^4$—$SiX_xR_{3-x}$, carboxyl, alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
$R^4$=—$(CHR^6$—$CHR^6)_n$—, where n=0 or 1, —$CHR^6$—$CHR^6$—S—$R^5$—, —CO—S—$R^5$—, —$CHR^6$—$CHR^6$—$NR^6$—$R^5$—, —Y—CS—NH—$R^5$, —S—$R^5$, —Y—CO—NH—$R^5$—, —CO—O—$R^5$—, —Y—CO—$C_2H_3$(COOH)—$R^5$—, —Y—CO—$C_2H_3$(OH)—$R^5$— or —CO—$NR^6$—$R^5$—,
$R^5$=alkylene, arylene, arylenealkylene or alkylenearylene comprising between 1 to 15 carbon atoms, further optionally comprising an atom or group selected from the group consisting of oxygen atom, sulfur atom, ester, carbonyl, carboxyl, amido, and amino,
$R^6$=hydrogen, alkyl or aryl having 1 to 10 carbon atoms,
$R^7$=hydrogen, alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
X=hydrogen, halogen, hydroxyl, alkoxy, acyloxy, alkylcarbonyl, alkoxycarbonyl or $NR''_2$, where R''=hydrogen, alkyl or aryl,
Y=—O—, —S— or —$NR^6$—,
Z=—O— or —$(CHR^6)_m$—, where m=1 or 2,
a=1, 2 or 3, where b=1 if a=2 or 3,
b=1, 2 or 3, where a=1 if b=2 or 3,
c=1 to 6,
x=1, 2 or 3, where a+x=2, 3 or 4;

(ii) a compound of formula II

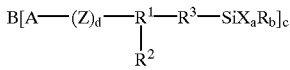

(II)

wherein
B=a straight-chain or branched organic radical having at least one C=C double bond and 4 to 50 carbon atoms,
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
$R^3$=alkylene, arylene, arylenealkylene or alkylenearylene comprising between 0 to 10 carbon atoms, wherein any of these radicals optionally is interrupted by an atom or group selected from the group consisting of oxygen atom, sulfur atom, and amino group,
X=hydrogen, halogen, hydroxyl, alkoxy, acyloxy, alkylcarbonyl, alkoxycarbonyl or $NR''_2$, where R''=hydrogen, alkyl, aryl or alkylaryl,
A=O, S or NH if d=1 and Z=CO and
$R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and
$R^2$=COOH or H, or
A=O, S, NH or COO if d=1 and Z=CHR', where
R'=H, alkyl, aryl or alkylaryl, and
$R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and
$R^2$=OH, or
A=O, S, NH or COO if d=0 and
$R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and
$R^2$=OH, or
A=S if d=1 and Z=CO and
$R^1$=N and
$R^2$=H,
a=1, 2 or 3,
b=0, 1 or 2, where a+b=3,
c=1, 2, 3 or 4;
(iii) a compound of formula III

(III)

wherein
A=O, S, PR'', POR'', NHC(O)O or NHC(O)NR'',
B=a straight-chain or branched organic radical derived from a compound B' having at least one (if c=1 and A=NHC(O)O or NHC(O)NR'') or at least two C=C double bond(s) and 5 to 30 carbon atoms,
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, R'=alkylene, arylene or alkylenearylene,
R"=hydrogen, alkyl, aryl or alkylaryl,
X=hydrogen, halogen, hydroxyl, alkoxy, acyloxy, alkylcarbonyl, alkoxycarbonyl or NR"$_2$,
a=1, 2 or 3,
b=0, 1 or 2,
c=0 or 1,
x=an integer whose maximum value corresponds to the number of double bonds in the compound B' minus 1, or is equal to the number of double bonds in the compound B' if c=1 and A is NHC(O)O or NHC(O)NR", wherein said alkyl and alkenyl radicals optionally are substituted straight-chain, branched or cyclic and comprise 1 to 20 carbon atoms, the aryl optionally is a substituted phenyl, naphthyl or biphenylyl, the alkoxy, acyloxy, alkylcarbonyl, alkoxycarbonyl, alkylaryl, arylalkyl, arylene, alkylene and alkylenearyl radical is a derivative of said alkyl or aryl radical;

(iv) a compound of formula IV

 (IV)

wherein
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
X=hydrogen, halogen, hydroxyl, alkoxy, acyloxy, alkylcarbonyl, alkoxycarbonyl or NR"$_2$, where R"=hydrogen, alkyl, aryl or alkylaryl,
Y=an organic radical having 1 to 30, preferably 1 to 20 carbon atoms and 1 to 5, preferably 1 to 4 mercapto groups,
a=1, 2 or 3,
x=1, 2 or 3, where a+x=2, 3 or 4; and (v) a precondensate derived from a compound shown represented in any of formulae I to IV
and wherein said hydrolytic polycondensation material further optionally comprises at least one compound selected from the group consisting of:
(i) a compound of formula V

 (V)

wherein
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
X=hydrogen, halogen, hydroxyl, alkoxy, acyloxy, alkylcarbonyl, alkoxycarbonyl or NR"$_2$, where R"=hydrogen, alkyl, aryl or alkylaryl,
a=1, 2 or 3; and
(ii) a precondensate derived from a compound of formula V
wherein said hydrolytic polycondensation is conducted by adding a substance selected from the group consisting of water, a solvent, and a condensation catalyst, and wherein said molar ratio of the sum of the compound(s) of formulaes I, II, III and IV to the sum of compound(s) of formula V is between 1:0 and 1:20.

Another embodiment of the invention provides an oxygenator membrane produced by a process according to processes described herein. Yet another embodiment provides a process selected from the group consisting of extracorporal membrane oxygenation, gas separation, reverse osmosis, electrodialysis, dialysis, pervaporation, microfiltration, ultrafiltration and hyperfiltration, wherein said process comprises effecting a separation using an oxygenator membrane prepared as described herein.

The low-viscosity to resinous liquid from which the membranes are manufactured is obtained
a) by hydrolytic polycondensation of
one or more compounds of the general formula I, and/or
one or more compounds of the general formula II, and/or
one or more compounds of the general formula III, and/or
one or more compounds of the general formula IV, and/or
precondensates derived from the compounds of the formulae I to IV, and, if desired,
one or more compounds of the general formula V, and/or precondensates derived therefrom, and, if desired,
b) by addition of
one or more monomers and/or oligomers which are addition-copolymerizable and/or can be subjected to a (poly)addition reaction,
and/or of one or more curing catalysts.

The hydrolytic polycondensation is carried out by adding water or moisture and, if desired, in the presence of a solvent and/or a condensation catalyst. Based on the monomers, the molar ratio of the sum of the compounds of the formulae I, II, III and IV to compounds of the formula V is between 1:0 and 1:20.

The liquid or resin used to produce the membranes of the invention therefore represents a polycondensate of hydrolytically condensed silicon compounds of the formulae I and/or II and/or III and/or IV and, if used, V, the polycondensate also comprising, if desired, water and/or solvent and/or the above-mentioned additives. Depending on its viscosity, the polycondensate can be referred to as a more or less viscous liquid or as a resin.

In the general formula I, the radicals and indices have the following meaning, herein for indices ≧2 the radicals can be identical or different.

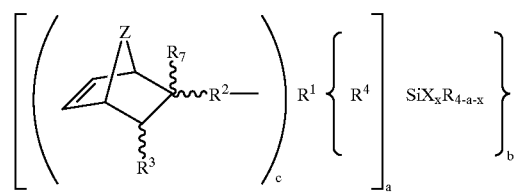 (I)

R=alkyl, alkenyl, aryl, alkylaryl or arylalkyl each having 1 to 15 carbon atoms, it being possible for these radicals to contain oxygen and/or sulfur atoms and/or ester and/or carbonyl and/or carboxyl and/or amido and/or amino groups.
$R^1$=alkylene, arylene, arylenealkylene or alkylenearylene each having 0 to 15 carbon atoms, it being possible for these radicals to contain oxygen and/or sulfur atoms and/or ester and/or carbonyl and/or carboxyl and/or amido and/or amino groups.
$R^2$=alkylene, arylene, arylenealkylene or alkylenearylene each having 0 to 15 carbon atoms, it being possible for these radicals to contain oxygen and/or sulfur atoms and/or ester and/or carbonyl and/or carboxyl and/or amido and/or amino groups.

$R^3$=hydrogen, $R^2$—$R^1$—$R^4$—$SiX_xR_{3-x}$, carboxyl, alkyl, alkenyl, aryl, alkylaryl or arylalkyl each having 1 to 15 carbon atoms, it being possible for these radicals to contain oxygen and/or sulfur atoms and/or ester and/or carbonyl and/or carboxyl and/or amido and/or amino groups.

$R^4$=—$(CHR^6$—$CHR^6)_n$—, where n=0 or 1, —$CHR^6$—$CHR^6$—S—$R^5$—, —CO—S—$R^5$—, —$CHR^6$—$CHR^6$—$NR^6$—$R^5$—, —Y—CS—NH—$R^5$—, —S—$R^5$—, —Y—CO—NH—$R^5$—, —CO—O—$R^5$—, —Y—CO—$C_2H_3$(COOH)—$R^5$—, —Y—CO—$C_2H_3$(OH)—$R^5$— or —CO—$NR^6$—$R^5$—. p1 $R^5$=alkylene, arylene, arylenealkylene or alkylenearylene each having 1 to 15 carbon atoms, it being possible for these radicals to contain oxygen and/or sulfur atoms and/or ester and/or carbonyl and/or carboxyl and/or amido and/or amino groups.

$R^6$=hydrogen, alkyl or aryl having 1 to 10 carbon atoms.

$R^7$=hydrogen, alkyl, alkenyl, aryl, alkylaryl or arylalkyl each having 1 to 15 carbon atoms, it being possible for these radicals to contain oxygen and/or sulfur atoms and/or ester and/or carbonyl and/or carboxyl and/or amido and/or amino groups.

X=hydrogen, halogen, hydroxyl, alkoxy, acyloxy, alkylcarbonyl, alkoxycarbonyl or $NR''_2$, where $R''$=hydrogen, alkyl, alkylaryl or aryl.

Y=—O—, —S— or —$NR^6$—.

Z=—O— or —$(CHR^6)_m$—, where m=1 or 2.

a=1, 2 or 3, where b=1 if a=2 or 3.

b=1, 2 or 3, where a=1 if b=2 or 3.

c=1 to 6.

x=1, 2 or 3, where a+x=2, 3 or 4.

An exhaustive description of organically modified silanes of the general formula I and their preparation, along with concrete examples, is given in DE 19627198 C2. The disclosure content of DE 19627198 C2 is hereby incorporated by reference in its entirety. Preferred embodiments of the membranes of the invention use organically modified silanes of the general formula I, and/or precondensates derived therefrom, in which the indices a and/or b and/or c adopt the value 1.

In the general formula II, the radicals and indices have the following meaning, wherein for indices ≧2 the radicals can be identical or different.

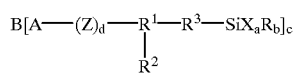

(II)

B=a straight-chain or branched organic radical having at least one C=C double bond and 4 to 50 carbon atoms.

R=alkyl, alkenyl, aryl, alkylaryl or arylalkyl each having 1 to 15 carbon atoms, it being possible for these radicals to contain oxygen and/or sulfur atoms and/or ester and/or carbonyl and/or carboxyl and/or amido and/or amino groups.

$R^3$=alkylene, arylene, arylenealkylene or alkylenearylene each having 0 to 10 carbon atoms, it being possible for these radicals to be interrupted by oxygen and/or by sulfur atoms and/or by amino groups.

X=hydrogen, halogen, hydroxyl, alkoxy, acyloxy, alkylcarbonyl, alkoxycarbonyl or $NR''_2$, where $R''$=hydrogen, alkyl, aryl or alkylaryl.

A=O, S or NH if d=1 and Z=CO and
  $R^1$=alkylene, arylene or alkylenearylene each having 1 to 10 carbon atoms, it being possible for these radicals to be interrupted by oxygen and/or by sulfur atoms and/or by amino groups, and
  $R^2$=COOH or H. or A=O, S, NH or COO if d=1 and Z=CHR', where R'=H, alkyl, aryl or alkylaryl, and
  $R^1$=alkylene, arylene or alkylenearylene each having 1 to 10 carbon atoms, it being possible for these radicals to be interrupted by oxygen and/or by sulfur atoms and/or by amino groups, and
  $R^2$=OH. or A=O, S, NH or COO if d=0 and
  $R^1$=alkylene, arylene or alkylenearylene each having 1 to 10 carbon atoms, it being possible for these radicals to be interrupted by oxygen and/or by sulfur atoms and/or by amino groups, and
  $R^2$=OH. or A=S if d=1 and Z=CO and
  $R^1$=N and
  $R^2$=H.

a=1, 2 or 3.

b=0, 1 or 2, where a+b=3.

c=1, 2, 3 or 4.

An exhaustive description of organically modified silanes of the general formula II and their preparation, along with concrete examples, is given in DE 4416857 C1. The disclosure content of DE 4416857 C1 is hereby incorporated by reference in its entirety. Preferred embodiments of the membranes of the invention use organically modified silanes of the general formula II, and/or precondensates derived therefrom, in which the alkyl and/or alkylene and/or alkoxy groups have 1 to 4 carbon atoms. In further preferred embodiments the radical B of the general formula II has one or more acrylate and/or methacrylate groups.

In formula III, the radicals and indices have the following meaning, wherein for indices ≧2 the radicals can be identical or different.

(III)

A=O, S, PR'', POR'', NHC(O)O or NHC(O)NR''.

B=a straight-chain or branched organic radical derived from a compound B' having at least one (if c=1 and A=NHC(O)O or NHC(O)NR'') or at least two C=C double bond(s) and 5 to 50 carbon atoms.

R=alkyl, alkenyl, aryl, alkylaryl or arylalkyl each having 1 to 15 carbon atoms, it being possible for these radicals to contain oxygen and/or sulfur atoms and/or ester and/or carbonyl and/or carboxyl and/or amido and/or amino groups.

R'=alkylene, arylene or alkylenearylene.

R''=hydrogen, alkyl, aryl or alkylaryl.

X=hydrogen, halogen, hydroxyl, alkoxy, acyloxy, alkylcarbonyl, alkoxycarbonyl or $NR''_2$.

a=1, 2 or 3.

b=0, 1 or 2.

c=0 or 1.

x=an integer whose maximum value corresponds to the number of double bonds in the compound B' minus 1, or is equal to the number of double bonds in the compound B' if c=1 and A is NHC(O)O or NHC(O)NR".

The above alkyl and alkenyl radicals are unsubstituted or substituted straight-chain, branched or cyclic radicals having 1 or, respectively, 2 to 20 carbon atoms. Aryl is unsubstituted or substituted phenyl, naphthyl or biphenylyl, and the above alkoxy, acyloxy, alkylcarbonyl, alkoxycarbonyl, alkylaryl, arylalkyl, arylene, alkylene and alkylenearyl radicals are derived from the above-defined alkyl and aryl radicals.

An exhaustive description of organically modified silanes of formula III and their preparation, along with concrete examples, is given in DE 4011044 C2. The disclosure content of DE 4011044 C2 is hereby incorporated by reference in its entirety. Preferred embodiments of the membranes of the invention use silanes of the general formula III, and/or precondensates derived therefrom, in which the radical B has one or more acrylate and/or methacrylate groups.

In formula IV, the radicals and indices have the following meaning, wherein for indices ≧2 the radicals can be identical or different.

$$Y_a SiX_x R_{4-a-x} \quad \text{(IV)}$$

R=alkyl, alkenyl, aryl, alkylaryl or arylalkyl each having 1 to 15 carbon atoms, it being possible for these radicals to contain oxygen and/or sulfur atoms and/or ester and/or carbonyl and/or carboxyl and/or amido and/or amino groups.

X=hydrogen, halogen, hydroxyl, alkoxy, acyloxy, alkylcarbonyl, alkoxycarbonyl or NR"$_2$, where R"=hydrogen, alkyl, aryl or alkylaryl.

Y=an organic radical having 1 to 30, preferably 1 to 20 carbon atoms and 1 to 5, preferably 1 to 4 mercapto groups.

a=1, 2 or 3.

x=1, 2 or 3, where a+x=2, 3 or 4.

The alkyl radicals are, for example, straight-chain, branched or cyclic radicals having 1 to 20, especially 1 to 10 carbon atoms and are preferably lower alkyl radicals having 1 to 6, with particular preference 1 to 4, carbon atoms. Specific examples are methyl, ethyl, n-propyl, isopropyl, n-butyl, isobutyl, s-butyl, t-butyl, n-pentyl, n-hexyl, cyclohexyl, 2-ethylhexyl, dodecyl, and octadecyl. The alkenyl radicals are, for example, straight-chain, branched or cyclic radicals having 2 to 20, preferably 2 to 10 carbon atoms and are preferably lower alkenyl radicals having 2 to 6 carbon atoms, such as vinyl, allyl and 2-butenyl. Preferred aryl radicals are phenyl, biphenylyl and naphthyl.

The alkoxy, acyloxy, alkylamino, dialkylamino, alkylcarbonyl, alkoxycarbonyl, arylalkyl, alkylaryl, alkylene and alkylenearylene radicals are preferably derived from the above-mentioned alkyl and aryl radicals. Specific examples are methoxy, ethoxy, n- and isopropoxy, n, iso-, s- and t-butoxy, monomethylamino, monoethylamino, dimethylamino, diethylamino, N-ethylanilino, acetyloxy, propionyloxy, methylcarbonyl, ethylcarbonyl, methoxycarbonyl, ethoxycarbonyl, benzyl, 2-phenylethyl, and tolyl.

Said radicals can if desired carry one or more substituents, examples being halogen, alkyl, hydroxyalkyl, alkoxy, aryl, aryloxy, alkylcarbonyl, alkoxycarbonyl, furfuryl, tetrahydrofurfuryl, amino, monoalkylamino, dialkylamino, trialkylammonium, amido, hydroxyl, formyl, carboxyl, mercapto, cyano, isocyanato, nitro, epoxy, SO$_3$H and PO$_4$H$_2$. Among the halogens, fluorine, chlorine and bromine, and especially chlorine, are preferred.

Particular embodiments of the membranes of the invention use silanes of the general formula IV'

$$[(HS-R^5)_n R^6-S-E-R^5]_a SiX_x R_{4-a-x} \quad \text{(IV')}$$

in which the radicals and indices are defined as follows:

E=—CO—NH—, —CS—NH—, —CH$_2$—CH$_2$— or —CH$_2$—CH(OH)—;

R=as defined for the general formula IV;

R$^5$=alkylene, arylene, arylenealkylene or alkylenearylene each having 1 to 15 carbon atoms, it being possible for these radicals to be interrupted by oxygen and/or by sulfur atoms and/or by ester and/or by carbonyl and/or by carboxyl and/or by amido and/or by amino groups;

R$^6$=alkylene, arylene, arylenealkylene or alkylenearylene each having 1 to 15 carbon atoms, it being possible for these radicals to be interrupted by oxygen and/or by sulfur atoms and/or by ester and/or by carbonyl and/or by carboxyl and/or by amido and/or by amino groups;

X=as defined for the general formula IV;

a=as defined for the general formula IV;

n=2, 3, 4 or 5;

x=as defined for the general formula IV.

An exhaustive description of organically modified silanes of the general formula IV' and their preparation, along with concrete examples, is given in DE 19627220 C2. The disclosure content of DE 19627220 C2 is hereby incorporated by reference in its entirety.

In formula V, the radicals and indices have the following meaning, wherein for indices ≧2 the radicals can be identical or different.

$$X_a SiR_{4-a} \quad \text{(V)}$$

R=alkyl, alkenyl, aryl, alkylaryl or arylalkyl each having 1 to 15 carbon atoms, it being possible for these radicals to contain oxygen and/or sulfur atoms and/or ester and/or carbonyl and/or carboxyl and/or amido and/or amino groups.

X=hydrogen, halogen, hydroxyl, alkoxy, acyloxy, alkylcarbonyl, alkoxycarbonyl or NR"$_2$, where R"=hydrogen, alkyl, aryl or alkylaryl.

a=1, 2 or 3.

The alkyl radicals are, for example, straight-chain, branched or cyclic radicals having 1 to 20, especially 1 to 10 carbon atoms and are preferably lower alkyl radicals having 1 to 6, with particular preference 1 to 4, carbon atoms. Specific examples are methyl, ethyl, n-propyl, isopropyl, n-butyl, isobutyl, s-butyl, t-butyl, n-pentyl, n-hexyl, cyclohexyl, 2-ethylhexyl, dodecyl, and octadecyl. The alkenyl radicals are, for example, straight-chain, branched or cyclic radicals having 2 to 20, preferably 2 to 10 carbon atoms and are preferably lower alkenyl radicals having 2 to 6 carbon atoms, such as vinyl, allyl and 2-butenyl. Preferred aryl radicals are phenyl, biphenylyl and naphthyl.

The alkoxy, acyloxy, alkylamino, dialkylamino, alkylcarbonyl, alkoxycarbonyl, arylalkyl, alkylaryl, alkylene and alkylenearylene radicals are preferably derived from the above-mentioned alkyl and aryl radicals. Specific examples are methoxy, ethoxy, n- and isopropoxy, n, iso-, s- and t-butoxy, monomethylamino, monoethylamino, dimethylamino, diethylamino, N-ethylanilino, acetyloxy, propionyloxy, methylcarbonyl, ethylcarbonyl, methoxycarbonyl, ethoxycarbonyl, benzyl, 2-phenylethyl, and tolyl.

Said radicals can if desired carry one or more substituents, examples being halogen, alkyl, hydroxyalkyl, alkoxy, aryl, aryloxy, alkylcarbonyl, alkoxycarbonyl, furfuryl, tetrahydrofurfuryl, amino, monoalkylamino, dialkylamino, trialkylammonium, amido, hydroxyl, formyl, carboxyl, mercapto, cyano, isocyanato, nitro, epoxy, $SO_3H$ and $PO_4H_2$. Among the halogens, fluorine, chlorine and bromine, and especially chlorine, are preferred.

Silanes of the general formula V are either available commercially or can be prepared in accordance with known methods, which are described, for example, in "Chemie und Technologie der Silicone", W. Noll, Verlag Chemie GmbH, Weinheim/Bergstraße (1968).

Without restricting the general nature of the description, concrete examples of silanes of the general formula V are as follows: $CH_3$—Si—$Cl_3$, $CH_3$—Si—$(OC_2H_5)_3$, $C_2H_5$—Si—$Cl_3$, $C_2H_5$—Si—$(OC_2H_5)_3$, $CH_2$=CH—Si—$(OC_2H_5)_3$, $CH_2$=CH—Si—$(OC_2H_4OCH_3)_3$, $(CH_3)_2$—Si—$Cl_2$, $CH_2$=CH—Si—$(OOCCH_3)_3$, $(CH_3)_2$—Si—$(OC_2H_5)_2$, $(C_2H_5)_3$—Si—Cl, $(C_2H_5)_2$—Si—$(OC_2H_5)_2$, $(CH_3)_2(CH_2$=CH)—Si—$Cl_2$, $(CH_3)_3$—Si—Cl, $(t-C_4H_9)(CH_3)_2$—Si—Cl, $(CH_3O)_3$—Si—$C_3H_6$—NH—$C_2H_4$—NH—$C_2H_4$—$NH_2$, $(CH_3O)_3$—Si—$C_3H_6$—SH, $(CH_3O)_3$—Si—$C_3H_6$—NH—$C_2H_4$—$NH_2$, $(CH_3O)_3$—Si—$C_3H_6$—Cl, $(CH_3)_2(CH_2$=CH—$CH_2$)—Si—Cl, $(CH_3O)_3$—Si—$C_3H_6$—O—C(O)—C($CH_3$)=$CH_2$, $(C_2H_5O)_3$—Si—$C_3H_6$—$NH_2$, $(C_2H_5O)_3$—Si—$C_3H_6$—CN,

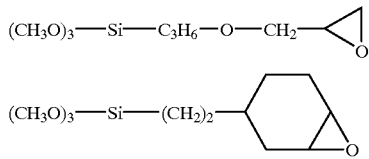

The silanes of the general formulae I, II, III, IV, IV' and V are hydrolyzable and polycondensable via the radicals X, and the hydrolytic polycondensation constructs an inorganic network having Si—O—Si bridges. The polycondensation rakes place preferably in accordance with the sol-gel process, as is described, for example, in DE-A1 2758414, 2758415, 3011761, 3826715 and 3835968. The polycondensation is carried out in the manner conventional in this field, by, for example, adding the required water at room temperature or with slight cooling directly (preferably with stirring and in the presence of a hydrolysis and condensation catalyst) to the silicon compounds to be hydrolyzed, which are present either as such or dissolved in a solvent, and then stirring the resulting mixture for a certain time (one or more hours). If reactive compounds are present, it is generally advisable to add the water in stages. Independently of the reactivity of the compounds present, the hydrolysis takes place in general at temperatures between −20 and 130° C. or at the boiling point of the solvent, if employed. As already indicated, the optimum manner of addition of water depends above all on the reactivity of the starting compounds used. For example, the dissolved starting compounds can be added slowly dropwise to an excess of water, or water is added in one or more portions to the starting compounds, as such or in solution. It may also be useful not to add the water as such but to introduce it into the reaction system with the aid of organic or inorganic systems comprising water. In many cases it has proven particularly suitable to introduce the amount of water into the reaction mixture with the aid of moisture-laden adsorbents, e.g., molecular sieves, and of water-comprising organic solvents, e.g., 80% strength ethanol. Alternatively, the addition of water can be made by way of a chemical reaction in the course of which water is liberated. Examples of such reactions are esterifications.

If a solvent is used, suitable solvents in addition to the lower aliphatic alcohols (e.g., ethanol or isopropanol) also include ketones, preferably lower dialkyl ketones, such as acetone or methyl isobutyl ketone, ethers, preferably lower dialkyl ethers such as diethyl ether or dibutyl ether, THF, amides, esters, especially ethyl acetate, dimethylformamide, amines, especially triethylamine, and mixtures thereof.

The starting compounds need not necessarily all be present to start with at the beginning of the hydrolysis (polycondensation); instead, it may even be found advantageous if to start with only some of these compounds are contacted with water and later the remaining compounds are added.

In order as far as possible to avoid instances of precipitation during hydrolysis and polycondensation, the water can be added in two or more stages, e.g., in three stages. In that case it is possible in the first stage, for example, to add from one tenth to one twentieth of the amount of water required for the hydrolysis. After short stirring, from one fifth to one tenth of the amount of water required can be added, and, after further brief stirring, finally, the remainder can be added.

The condensation time depends on the respective starting components and on their quantitative proportions, on the catalyst if used, on the reaction temperature, etc. In general, the polycondensation takes place at atmospheric pressure but it can also be conducted under elevated or reduced pressure.

The polycondensate thus obtained can be processed to the membranes of the invention either as it is or following partial or virtually complete removal of the solvent used. In some cases it may prove advantageous to replace the excess water and the solvent formed, plus any additional solvent used, in the product obtained following polycondensation by another solvent, in order to stabilize the polycondensate. For this purpose the reaction mixture can be thickened, for example, under reduced pressure at slightly elevated temperature to such an extent that it can be still taken up with another solvent without problems.

The polycondensate obtained in this way is a more or less viscous liquid or a resin, and is processed to flat or tubular membranes by conventional methods. After the shaping operation and any drying that may be required, the resulting membrane is cured by formation of an organic network.

The silanes of the formula I and polycondensates resulting from them can be subjected to an addition polymerization and/or to a polyaddition by way of the bicyclic radicals, the silanes of the formulae II and III and their polycondensates by way of the radicals B, and the silanes of the formulae IV and IV' and their polycondensates by way of the mercapto groups. These addition polymerization and/or polyaddition reactions construct an organic network. The polycondensate resulting from the silanes of the formulae I to V, and the membrane manufactured from it, can therefore be cured by addition polymerization and/or by polyaddition. These curing reactions are conducted thermally and/or induced by radiation and/or induced chemically. Curing results in an inorganic-organic network, i.e., the membranes of the invention possess an inorganic-organic network. By varying the organic and/or the inorganic network, e.g., the network density, it is possible to vary the chemical and physical properties of the membranes of the invention within wide ranges and to adapt the profile of properties of the membranes of the invention to the requirements of the particular application.

The polycondensate employed to prepare the membranes of the invention can comprise further additives. These additives can be added prior to and/or during and/or subsequent to the polycondensation. These additives comprise, for example, monomers and/or oligomers which are addition-copolymerizable and/or can be subjected to an addition and/or polyaddition reaction. These monomers and/or oligomers are incorporated into the organic network of the membrane of the invention by way of addition polymerization and/or (poly)addition reactions in the course of the curing of the resultant membrane. Where hydrolyzable silicon compounds having SH and/or C=C and/or amino groups are used, and where they are added prior to the hydrolytic polycondensation, these compounds are incorporated into the inorganic network of the membranes of the invention in the course of the polycondensation and into the organic network of the membranes of the invention in the course of the addition polymerization and/or (poly)addition.

Further additives which may be present in the polycondensate used to prepare the membranes of the invention are, for example, curing catalysts. These are necessary, for example, if curing of the resultant membrane is induced chemically.

The oxygenator membranes of embodiments of the invention are not porous.

To produce continuous flat membranes, for example, it is preferred to employ solvent-free systems. Solvent-based systems likewise can be processed. In either case, the material is applied continuously to a rotating roll. The formation of a film by means of a slotted coating bar is followed by curing, e.g., radiation-induced curing, and by detachment and winding of the membranes.

To produce a continuous hollow fiber, for example, it is preferred to use a solvent-free system (although solvent-based systems can likewise be processed) from which hollow fiber is manufactured as follows. First, the resinous polycondensate is extruded through an annular die, the lumen being generated by means of a gas- and/or liquid-carrying inner die. The dimension of the resin filament is established in accordance with conventional methods through the variation of the spinning parameters, such as, for example, the takeoff rate, the temperature, the pressure, etc. Subsequently, the resin filament is subjected to initial crosslinking by means of an annular initial-curing component, e.g., a radiation source, directly below the spinning die, so preserving its shape. Final curing is accomplished by means of an all-round irradiator disposed therebelow. The resulting continuous fiber is wound up and rewound. Initial and/or final curing can be accomplished not only by radiation-induced curing but also by self-induced or chemically induced curing. A combination of different curing principles is likewise possible.

Curing of the membranes takes place in accordance with conventional methods with thermal, radiative or chemical induction. It may be necessary to add conventional curing catalysts. Curing takes place in accordance with methods as are described, for example, in DE 4011044 C2, DE 4310733 A1, DE 4405261 A1, DE 4416857 C1, DE 19627198 C2 and DE 19627220 C2.

The membranes of the invention can be produced in both single-phase and two-phase embodiments with and without porosity. Two-phase membranes are obtained from systems which are not miscible but instead form emulsions. Systems of this kind can be processed either to fiber or to film, by producing an emulsion of the immiscible components by means, for example, of conjoint stirring, processing this emulsion to membranes by conventional methods, and curing the immiscible components together in the course of the curing of the resultant membrane. Another variant consists in processing systems where phase separation occurs during the synthesis. By means of these two-phase variants it is possible to manufacture membranes of the invention which consist of a stable organic-inorganic network inlaid with a continuous, highly permeable second phase.

The production process of the membranes of the invention is simple, inexpensive and can be carried out within a very small area. It is suitable for the continuous production of hollow fiber and films, and all common curing principles can be employed. Because of the toxicological acceptability of the materials, the membranes of the invention can be employed without problems in the medical sector. The surface modifications which are often required for various applications, for example, to avoid blood coagulation, to adjust the polarity, adsorption, etc., can be carried out either during the actual synthesis of the material, i.e., in situ, or subsequently. Examples of such surface modifications are coatings with heparin, with hydrophilic or hydrophobic silanes, with fluorosilanes, and with biomolecules.

The membranes of the invention combine high mechanical stability with high permeation values, even in the absence of pores. It is therefore still possible to retain high permeation values while producing self-supporting films and hollow fiber, without the risk, for example, of penetration of the fluid phase.

The following exemplary modifications can be used to adapt the permeability of the membrane to the requirements of the particular application.

Variation of the organic and of the inorganic structural density

Variation of the amount of dimethylsilane units present

Chemical and physical incorporation of organic or inorganic prefabricated, highly permeable monomers, oligomers or polymers Silanization of free SiOH groups with trimethylsilyl units.

Variation of the Inorganic Structural Density

Without restricting the general nature of the description, the effect of the inorganic structural density on $O_2$ permeability, modulus of elasticity, and strength of the resultant membranes is indicated comparatively for the following resin systems. The associated results are summarized in table form. In very general terms, an increase in the inorganic structural density can be said to lead to an increase in the mechanical stability and to a reduction in the oxygen permeability.

In the case of resin type 1, glycerol 1,3-dimethacrylate and 3-isocyanatopropyltriethoxysilane are first linked to one another according to the following reaction scheme.

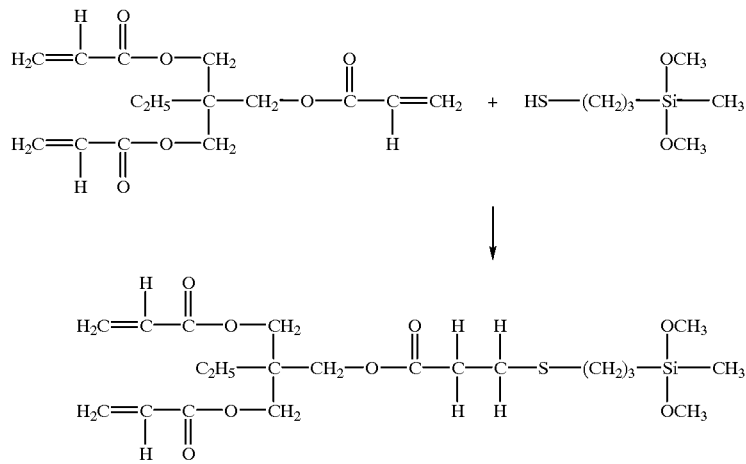

The resultant silane is subjected to hydrolytic polycondensation to construct the inorganic network. The 1,12-dodecanediol dimethacrylate can be added before, during or after polycondensation. The resulting mixture is processed by a conventional method to make a membrane whose curing is accompanied by the construction of the organic network as a result of addition polymerization of the methacrylate groups.

For synthesis from resin type 2, the trimethylolpropane triacrylate and the mercaptopropylmethyldimethoxysilane are first linked to one another in accordance with the following reaction scheme.

| Resin type | Number of hydrolyzable and condensable groups per base unit | $O_2$ permeability [x] | Modulus of elasticity [MPa] | Strength [MPa] |
|---|---|---|---|---|
| 1 | 3 | $0.09 \cdot 10^{-10}$ | 2640 | 106 |
| 2 | 2 | $0.23 \cdot 10^{-10}$ | 1520 | 59 |
| 3 | 4 | $0.07 \cdot 10^{-10}$ | 3000 | 120 |

$O_2$ permeability: $x = cm^3/cm \cdot s \cdot cmHg$

| Resin type | Number of hydrolyzable and condensable groups per base unit | $O_2$ permeability $[cm^3/cm \cdot s \cdot cmHg]$ |
|---|---|---|
| 4 | 2 | $11.5 \cdot 10^{-10}$ |
| 5 | 2.5 | $3.9 \cdot 10^{-10}$ |
| 6 | 3 | $1.2 \cdot 10^{-10}$ |

| Precursors | Molar ratio |
|---|---|
| Resin type 1: glycerol 1,4-dimethacrylate | 1.0 |
| 3-isocyanatopropyltriethoxysilane | 1.0 |
| 1,12-dodecanediol dimethacrylate | 0.2 |
| Resin type 2: trimethylolpropane triacrylate | 1.2 |
| mercaptopropylmethyldimethoxysilane | 1.0 |
| Resin type 3: tris(2-hydroxyethyl)isocyanurate triacrylate | 1.0 |
| mercaptopropylmethyldimethoxysilane | 1.0 |
| tetraethoxysilane | 1.0 |
| Resin type 4: trimethylolpropane triacrylate | 1.0 |
| mercaptopropylmethyldimethoxysilane | 1.0 |
| dimethyldiethoxysilane | 4.0 |
| Resin type 5: trimethylolpropane triacrylate | 1.0 |
| mercaptopropylmethyldimethoxysilane | 1.0 |
| dimethyldiethoxysilane | 2.0 |
| methyltrimethoxysilane | 2.0 |
| Resin type 6: trimethylolpropane triacrylate | 1.0 |
| mercaptopropylmethyldimethoxysilane | 1.0 |
| methyltrimethoxysilane | 4.0 |

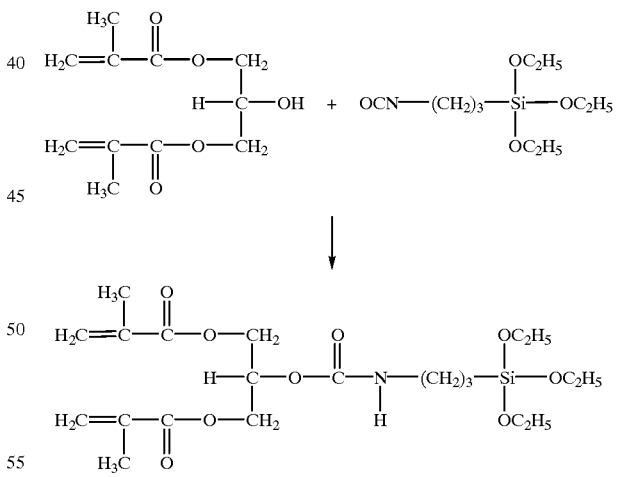

The resultant silane is subjected to hydrolytic polycondensation to construct the inorganic network. The polycondensate is then processed by conventional methods to manufacture membranes whose curing gives rise to the construction of the organic network by addition polymerization of the acrylate groups.

For synthesis from resin type 3, tris(2-hydroxyethyl) isocyanurate triacrylate and mercaptopropylmethyldimethoxysilane are first linked to one another in accordance with the following reaction scheme.

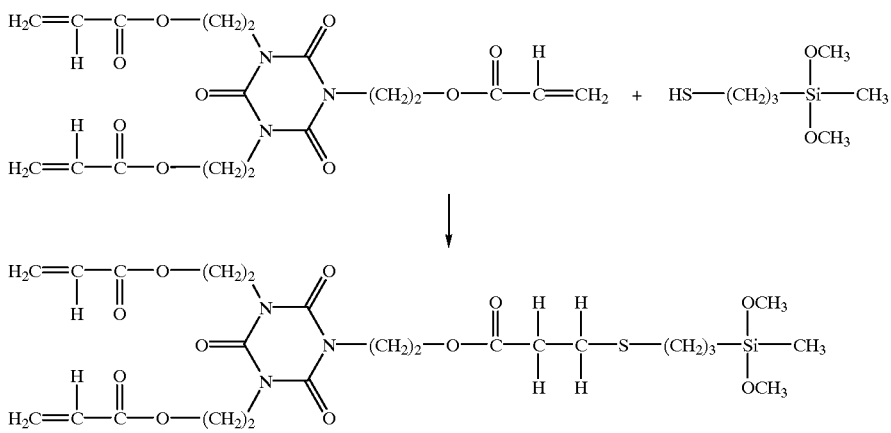

The resulting silane is subjected to hydrolytic polycondensation with tetraethoxysilane to construct the inorganic network, and the membrane manufactured therefrom is cured by addition polymerization of the acrylate groups.

For synthesis from resin type 4, the trimethylolpropane triacrylate and the mercaptopropylmethyldimethoxysilane are first linked to one another as described for resin type 2. The resultant silane is subjected to hydrolytic polycondensation with the dimethyldiethoxysilane, and the membrane manufactured therefrom is cured by addition polymerization of the acrylate groups.

For synthesis from resin type 5, the trimethylolpropane triacrylate and the mercaptopropylmethyldimethoxysilane are first linked to one another as described for resin type 2. The resultant silane is subjected to hydrolytic polycondensation with the dimethyldiethoxysilane and with the methyltrimethoxysilane, and the membrane manufactured therefrom is cured by addition polymerization of the acrylate groups.

For synthesis from resin type 6, the trimethylolpropane triacrylate and the mercaptopropylmethyldimethoxysilane are first linked to one another as described for resin type 2. Subsequently, the resultant silane is subjected to hydrolytic polycondensation together with the methyltrimethoxysilane, and the membrane manufactured therefrom is cured by addition polymerization of the acrylate groups.

With the same organic crosslinking potential, the higher inorganic crosslinking potential of system 1 provides a higher modulus of elasticity, higher flexural strength, and a lower $O_2$ permeability coefficient compared to that of system 2. The addition of the quadruply hydrolyzable and condensable tetraethoxysilane in the case of system 3 brings about (relative to system 2) an increase in the inorganic crosslinking density with simultaneous reduction in $O_2$ permeability. A comparison of systems 4, 5 and 6 shows that replacing methyl groups by alkoxy groups, which increase the crosslinking potential leads to a reduction in $O_2$ permeability.

Variation of the Organic Structural Density, Silanization of SiOH Groups, and Incorporation of Permeation-increasing Monomers Without restricting the general nature of the description, the effect of the organic structural density on $O_2$ permeability, modulus of elasticity, and strength of the resultant membranes is shown comparatively between further resin types. The associated results are summarized in table form. Very generally, a reduction in the organic crosslinking potential can be said to lead to a marked reduction in the mechanical strength and an increase in the $O_2$ permeability. Through the silanization of SiOH groups and/or incorporation of reactive monomers it is possible to increase further the $O_2$ permeability of the membranes of the invention.

The polycondensates are generally not fully inorganically condensed; in other words, there are free $\equiv$SiOH groups. In the course of a silanization these groups can be reacted, for example, to $\equiv$Si—O—Si(CH$_3$)$_3$ groups. This results first in a loosening of the overall structure of the membrane of the invention and second in an increase in the number of the Si—O—Si groups, which favors the $O_2$ permeability. The silanization is monitored by recording the IR spectrum, on the basis of the disappearance of the residual SiOH band.

| | Precursors | Molar ratio |
|---|---|---|
| Resin type 2: | trimethylolpropane triacrylate | 1.2 |
| | mercaptopropylmethyldimethoxy-silane | 1.0 |
| Resin type 7: | 1,12-dodecanediol dimethacrylate | 1.0 |
| | mercaptopropylmethyldimethoxy-silane | 1.0 |
| Resin type 8: | silanized resin type 7 | |
| Resin type 9: | silanized resin type 2 | 2.0 |
| | methacryloxypropyltris(trimethyl-siloxy)silane (TRIS) | 1.0 |
| Resin type 10: | silanized resin type 7 | 3.0 |
| | 1,3-bis(3-methacryloxypropyl)-tetrakis(trimethylsiloxy)disiloxane (TETRAKIS) | 1.0 |

| Resin type | Number of organically crosslinkable groups per base unit | $O_2$ permeability [x] | Modulus of elasticity [MPa] |
|---|---|---|---|
| 2 | 2 | $0.23 \cdot 10^{-10}$ | 1520 |
| 7 | 1 | $3.2 \cdot 10^{-10}$ | 11.2 |

$O_2$ permeability: x = cm$^3$/cm · s · cmHg

| Resin type | $O_2$ permeability [cm$^3$/cm · s · cmHg] |
|---|---|
| 2 silanized | $2.3 \cdot 10^{-10}$ |
| 8 | $13.9 \cdot 10^{-10}$ |
| 9 | $13.2 \cdot 10^{-10}$ |
| 10 | $20 \cdot 10^{-10}$ |

The production of membranes from resin type 2 was described during the discussion of the inorganic structural density.

For synthesis from resin type 7, 1,12-dodecanediol dimethacrylate and mercaptopropylmethyldimethoxysilane are first linked to one another in accordance with the following reaction scheme.

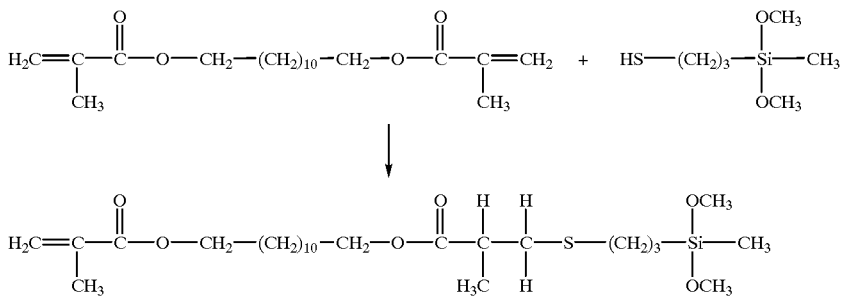

Subsequently, the resultant silane is subjected to hydrolytic polycondensation and the membrane manufactured therefrom is cured by addition polymerization of the methacrylate groups.

For synthesis from resin type 8, SiOH groups of resin type 7 which are still present following the polycondensation are first silanized in accordance with the following reaction scheme.

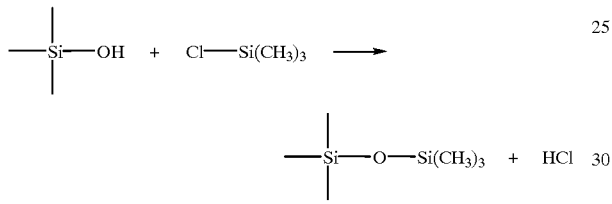

The membranes manufactured therefrom are cured by addition polymerization of the methacrylate groups.

For synthesis from resin types 9 and 10, silanization is followed by the incorporation of the reactive monomers TRIS and TETRAKIS, respectively.

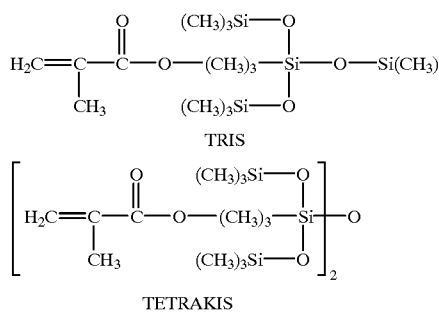

The membranes manufactured therefrom are cured by addition polymerization of the methacrylic groups.

With the same inorganic crosslinking of systems 2 and 7, a reduction in the organic crosslinking potential of system 7 brings about a marked reduction in the modulus of elasticity and an increase in permeation. Resin type 8 shows a further increase in the $O_2$ permeability in comparison to resin type 7, as a consequence of the silanization. In comparison to resin type 8, the addition of the reactive monomer TRIS in the case of resin type 9 brings about the incorporation into the resultant membrane of end groups which favor $O_2$ permeation. In comparison to resin type 8, the addition of the crosslinking component TETRAKIS in the case of resin type 10 further increases the $O_2$ permeability of the resultant membrane.

Incorporation of Dimethylsiloxane Structures

The $O_2$ permeability of the resultant membrane is likewise increased, for example, through the incorporation of dimethylsiloxane structures. Without restricting the general nature of the description, incorporation into the polycondensate takes place, for example, by co-condensation of, for instance, dimethyldialkoxysilane, by addition reaction of amino-terminated polydimethylsiloxane, or by co-addition polymerization of acryloxy-terminated polydimethylsiloxane. The range of variation which this gives in terms of $O_2$ permeation amounts to three orders of magnitude.

In the case of the following examples, whose results are summarized in table form, in incorporation of dimethylsiloxane structures into the polycondensate takes place by co-addition polymerization.

| Resin type | Number of —Si(CH$_3$)$_2$—O— groups/ base unit | $O_2$ permeability [x] |
|---|---|---|
| 11 | 0 | 0.09 · 10$^{-10}$ |
| 12 | 4 | 22 · 10$^{-10}$ |
| 13 | 6 | 66 · 10$^{-10}$ |
| 14 | 8 | 120 · 10$^{-10}$ |
| 15 | 10 | 140 · 10$^{-10}$ |

$O_2$ permeability: x = cm$^3$/cm · s · cmHg

| Precursors | | Molar ratio |
|---|---|---|
| Resin type 11: | glycerol 1,3-dimethacrylate | 1 |
| | isocyanatopropyltriethoxysilane | 1 |
| | dimethyldiethoxysilane | 0 |
| Resin type 12: | glycerol 1,3-dimethacrylate | 1 |
| | isocyanatopropyltriethoxysilane | 1 |
| | dimethyldiethoxysilane | 4 |
| Resin type 13: | glycerol 1,3-dimethacrylate | 1 |
| | isocyanatopropyltriethoxysilane | 1 |
| | dimethyldiethoxysilane | 6 |
| Resin type 14: | glycerol 1,3-dimethacrylate | 1 |
| | isocyanatopropyltriethoxysilane | 1 |
| | dimethyldiethoxysilane | 8 |
| Resin type 15: | glycerol 1,3-dimethacrylate | 1 |
| | isocyanatopropyltriethoxysilane | 1 |
| | dimethyldiethoxysilane | 10 |

For synthesis from resin types 11 to 15, glycerol 1,3-dimethacrylate and 3-isocyanatopropyltriethoxysilane are first linked to one another according to the following reaction scheme.

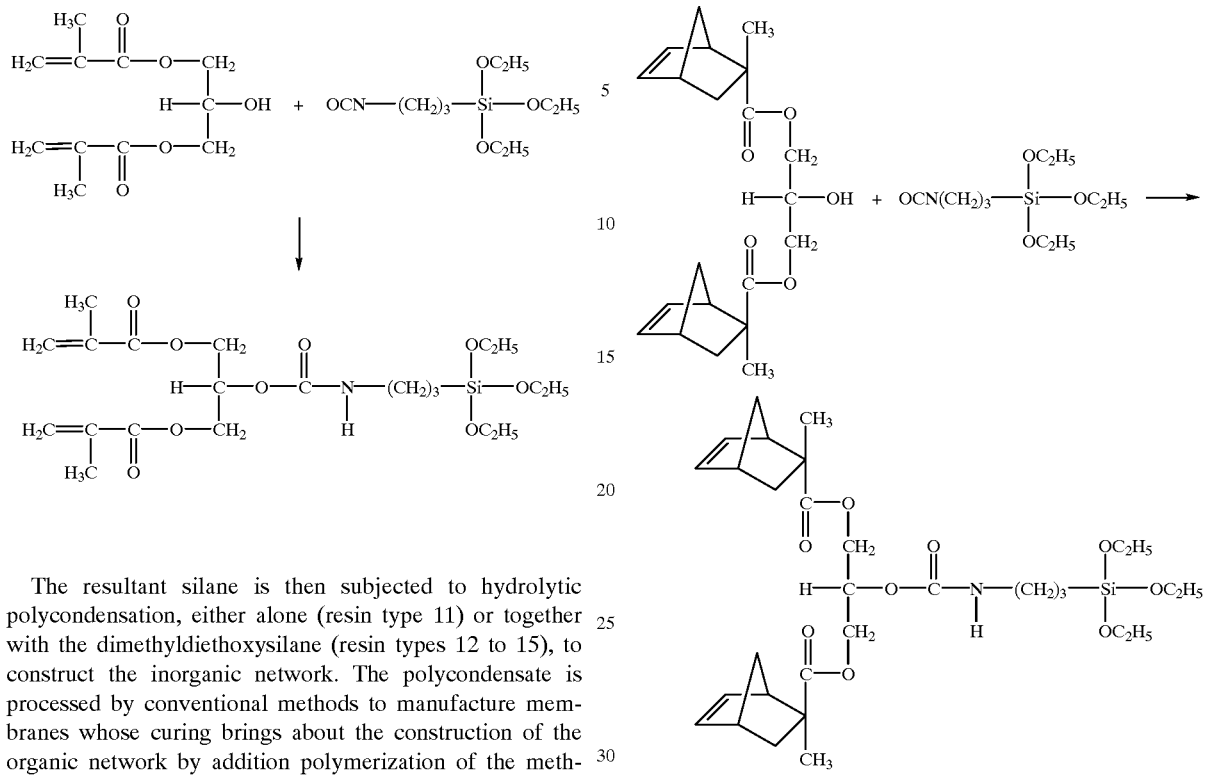

The resultant silane is then subjected to hydrolytic polycondensation, either alone (resin type 11) or together with the dimethyldiethoxysilane (resin types 12 to 15), to construct the inorganic network. The polycondensate is processed by conventional methods to manufacture membranes whose curing brings about the construction of the organic network by addition polymerization of the methacrylate groups.

In further exemplary embodiments, incorporation of dimethylsiloxane units into the polycondensate occurs by co-polycondensation with dimethyldiethoxysilane. The results obtained are summarized in the table below.

| Resin type | Number of —Si(CH$_3$)$_2$—O— groups/ base unit | O$_2$ permeability [x] |
|---|---|---|
| 16 | ½ | $1.7 \cdot 10^{-10}$ |
| 17 | 2 | $4.0 \cdot 10^{-10}$ |
| 18 | 4 | $9.1 \cdot 10^{-10}$ |
| 19 | 6 | $31 \cdot 10^{-10}$ |

O$_2$ permeability: x = cm$^3$/cm · s · cmHg

| | Precursors | Molar ratio |
|---|---|---|
| Resin type 16: | "norbornene-silane" | 1 |
| | trimethylolpropane tris(3-mercaptopropionate) | 1 |
| | dimethyldiethoxysilane | ½ |
| Resin type 17: | "norbornene-silane" | 1 |
| | trimethylolpropane tris(3-mercaptopropionate) | 1 |
| | dimethyldiethoxysilane | 2 |
| Resin type 18: | "norbornene-silane" | 1 |
| | trimethylolpropane tris(3-mercaptopropionate) | 1 |
| | dimethyldiethoxysilane | 4 |
| Resin type 19: | "norbornene-silane" | 1 |
| | trimethylolpropane tris(3-mercaptopropionate) | 1 |
| | dimethyldiethoxysilane | 6 |

First, the "norbornene-silane" of resin types 16 to 19 is prepared according to the following reaction scheme and then subjected to hydrolytic polycondensation with the dimethyldiethoxysilane. The resultant polycondensate is admixed with trimethylolpropane tris(3-mercaptopropionate) and processed to membranes whose curing then takes place by radiation-induced polyaddition of the trimethylolpropane tris(3-mercaptopropionate) onto the C=C double bonds of the norbornene radicals.

In the examples which follow, incorporation of dimethylsiloxane units into polycondensate occurs by addition reaction of aminopropyl-terminated polydimethylsiloxane with about 65 —Si(CH$_3$)$_2$—O— segments (=DMS A 21). The results obtained are summarized in the following table.

| Resin type | Number of —Si(CH$_3$)$_2$—O— groups/ base unit | O$_2$ permeability [x] |
|---|---|---|
| 20 | 2 | $19 \cdot 10^{-10}$ |
| 21 | 6 | $160 \cdot 10^{-10}$ |

O$_2$ permeability: x = cm$^3$/cm · s · cmHg

| | Precursors | Molar ratio |
|---|---|---|
| Resin type 20: | trimethylolpropane triacrylate | 1.2 |
| | mercaptopropylmethyldimethoxy-silane DMS A 21 | 1.0 |
| | solvent: n-butyl acetate | 0.03 |
| Resin type 21: | trimethylolpropane triacrylate | 1.2 |
| | mercaptopropylmethyldimethoxy-silane DMS A 21 | 1.0 |
| | solvent: n-butyl acetate | 0.09 |

For synthesis from resin types 20 and 21, the trimethylolpropane triacrylate and the mercaptopropylmethyldimethoxysilane are first linked to one another in accordance with the following reaction scheme.

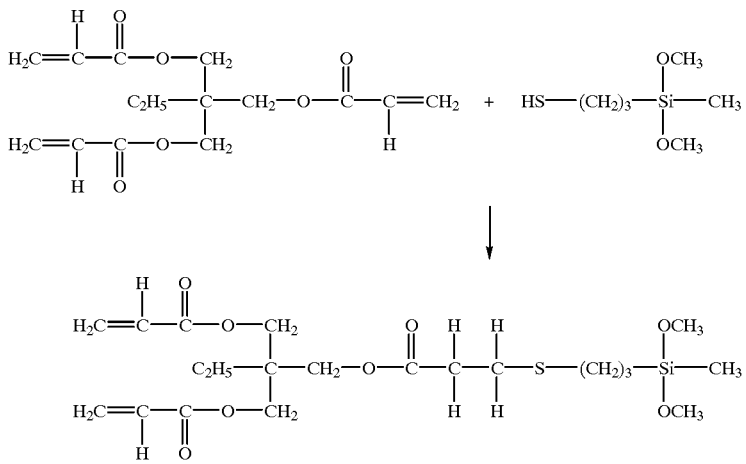

For the further processing of the silane into membranes of the invention, two variations are preferred:

The resultant silane is first subjected to hydrolytic polycondensation to construct the inorganic network, and the polycondensate is linked to the polydimethylsiloxane via addition reaction of acrylate and amino groups.

The resultant silane is first linked to the polydimethylsiloxane via addition reaction of acrylate and amino groups, and the addition product is subjected to hydrolytic polycondensation to construct the inorganic network.

The membrane manufactured from the resultant polycondensate is then cured by addition polymerization of the acrylate groups, to construct the organic network. The solvent is removed quantitatively.

In the example which follows, dimethylsiloxane units are incorporated into polycondensate by co-addition polymerization with a relatively short-chain polydimethylsiloxane, which contains terminal acrylate groups and consists of about 14 dimethylsiloxane units (PDMS U22 from ABCR). The results obtained are given in the following table.

| Resin type | Number of —Si(CH$_3$)$_2$—O— groups/ base unit | O$_2$ permeability [x] |
|---|---|---|
| 22 | 1.5 | 6.8 · 10$^{-10}$ |

O$_2$ permeability: x = cm$^3$/cm · s · cmHg

| | Precursors | Molar ratio |
|---|---|---|
| Resin type 22: | glycerol 1,3-dimethacrylate | 8.0 |
| | 3-isocyanatopropyltriethoxysilane | 8.0 |
| | 1,12-dodecanediol dimethacrylate | 1.6 |
| | PDMS U22 | 1.0 |

As described for resin type 1, glycerol 1,3-dimethacrylate and 3-isocyanatopropyltriethoxysilane first are linked to one another. The resultant silane is subjected to hydrolytic polycondensation in order to construct the inorganic network. The 1,12-dodecanediol dimethacrylate and/or the PDMS U22 can be added before, during or after the polycondensation. Then the PDMS U22 is chemically anchored in the polycondensate by co-addition polymerization of the acrylate and the methacrylate groups. The resultant mixture is processed by conventional methods to manufacture membranes. While in curing the membranes, the organic network is built up further by addition polymerization of the remaining methacrylate groups.

The table below summarized O$_2$ permeabilities of silanized and nonsilanized systems produced according to embodiments of the invention. It is clear that the silanization of free —OH units by, for example, trimethylsilyl units provides an increase in O$_2$ permeability.

| Resin type | O$_2$ permeability [x] silanized | O$_2$ permeability [x] nonsilanized |
|---|---|---|
| 2 | 2.3 · 10$^{-10}$ | 0.23 · 10$^{-10}$ |
| 4 | 25 · 10$^{-10}$ | 11.5 · 10$^{-10}$ |
| 7 | 13.9 · 10$^{-10}$ | 3.2 · 10$^{-10}$ |

O$_2$ permeability: x = cm$^3$/cm · s · cmHg

The precursors for and the preparation of resin types 2, 4 and 7 have been described in the context of varying the organic and inorganic structural densities. The silanization of the polycondensates takes place, in accordance with the following reaction scheme, by reaction with trimethylchlorosilane.

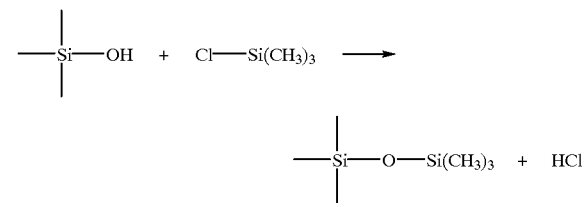

Alternatively, the silanization can be carried out by adding hexamethyldisilazane (HMDS) to the tetrahydrofuran (THF)-diluted batch under an argon atmosphere. This likewise converts free Si—OH groups to Si—CH$_3$ groups.

The membranes manufactured therefrom are cured by addition polymerization of the acrylate and/or methacrylate groups. The silanization has no effect on the process parameters in the course of spinning or film casting, provided the silanization occurs directly prior to further processing and so does not influence the aging effect.

Exemplary Embodiment of Two-phase Systems

| Resin type | $O_2$ permeability [x] |
|---|---|
| 23 | $21 \cdot 10^{-10}$ |

$O_2$ permeability: $x = cm^3/cm \cdot s \cdot cmHg$

| | Precursors | Molar ratio |
|---|---|---|
| Resin type 23: | trimethylolpropane triacrylate | 1 |
| | mercaptopropylmethyldimethoxysilane | 1 |
| | dimethyldiethoxysilane | 4 |
| | DMS A 21 | 0.33 |

For synthesis from resin type 23, the trimethylolpropane triacrylate and the mercaptopropylmethyldimethoxysilane are first linked to one another as described for resin type 4. Subsequently, the resultant silane is subjected to hydrolytic polycondensation together with the dimethyldiethoxysilane. The resultant polycondensate is immiscible with the amino-terminated polydimethylsiloxane. A two-phase mixed system is obtained that can be processed into membranes that have a milky cloudiness and that are cured by addition polymerization of the acrylate groups.

The membranes of embodiments of the invention can be used in extracorporal respiration. The membranes exhibit an excellent permeation rate for $O_2$ and $CO_2$, and so are outstandingly suitable for use, for example, in oxygenators.

EXAMPLES

The following working examples illustrate production of membranes according to representative embodiments of the invention.

Hollow Fiber Production

For each relevant example, the resin (viscosity at process temperature (10° C.): about 100 Pas) admixed with a photoinitiator (e.g., 2% Irgacure 184, from Ciba Geigy) is extruded through an annular die (external diameter: about 1 mm, thickness of annulus: about 0.2 mm). The hollow filament geometry is initially stabilized by means of a second, concentric inner die, flushed with $N_2$, until organic curing is effected by a combination of two UV radiation units (e.g., Blue Point II, from Hönle, with an all-round irradiator F 300, from Fusion). Without restricting the general nature of the description, the following spinning parameters are chosen.

| Spinning parameters: | temperature: | 8° C. |
|---|---|---|
| | pressure: | 15 bar |
| | takeoff speed: | 0.8 m/s |

The hollow fiber is subsequently wound up. By varying the spinning parameters (spinning-mass temperature, pressure, takeoff speed, gas flow rate through the inner channel) the fiber geometry is varied over a wide range.

Film Production

For each relevant example the resin admixed with a photoinitiator (e.g., 1% Irgacure 184, from Ciba Geigy) is applied to a highly polished roll by means of a slotted coating bar. Following passage through a UV curing unit (e.g., UVAPRINT CM, from Hönle) the film is detached and wound up. By varying the rotary speed of the rolls, the roll temperature and the size of the slot, the film thickness is established.

Example 1

| Precursors: | trimethylolpropane triacrylate (TMPTA) | 1 mol |
|---|---|---|
| | mercaptopropylmethyldimethoxysilane | 1 mol |
| | dimethyldiethoxysilane | 4 mol |
| $O_2$ permeability [$10^{-10}$ cm³ (STP)/cm · s cmHg] | | 11.5 |

Synthesis of the Resin 54.15 g (0.3 mol) of mercaptopropylmethyldimethoxysilane are added under an argon atmosphere and with ice cooling to 89.03 g (0.3 mol) of trimethylolpropane triacrylate (TMPTA) in 300 ml of ethyl acetate. 19.55 g of an ethanolic KOH solution are subsequently added slowly [dropwise]. Following the addition of 8.73 g of 0.5 N HCl and 10 minutes of stirring, 178.03 g (1.2 mol) of dimethyldiethoxysilane and 35.0 g of 0.12 N HCl are added. After 23 h of stirring at RT, the batch is subjected to extraction by shaking with water and filtered. The filter product is concentrated on a rotary evaporator to a solids content of 89%.

Example 2

Incorporation of the $O_2$ permeation promoting crosslinker 1,3-bis(3-methacryloxypropyl)tetrakis(timethylsiloxy)disiloxane (TETRAKIS).

| Precursors: | dodecanediol dimethacrylate | 1 mol |
|---|---|---|
| | mercaptopropylmethyldimethoxysilane | 1 mol |
| | TETRAKIS | ⅓ mol |
| $O_2$ permeability [$10^{-10}$ cm³ (STP)/cm · s cmHg]: | | 20 |

Example 3

Incorporation of dimethylsiloxane structures by condensation

| Resin A | Precursors: | glycerol 1,3-dimethacrylate | 1 mol |
|---|---|---|---|
| | | isocyanatopropyltriethoxysilane | 1 mol |
| | | dimethyldiethoxysilane | 4 mol |
| $O_2$ permeability [$10^{-10}$ cm³ (STP)/cm · s cmHg]: | | | 22 |
| Resin B | Precursors: | glycerol 1,3-dimethacrylate | 1 mol |
| | | isocyanatopropyltriethoxysilane | 1 mol |
| | | dimethyldiethoxysilane | 6 mol |
| $O_2$ permeability [$10^{-10}$ cm³ (STP)/cm · s cmHg]: | | | 66 |
| Resin C | Precursors: | glycerol 1,3-dimethacrylate | 1 mol |
| | | isocyanatopropyltriethoxysilane | 1 mol |
| | | dimethyldiethoxysilane | 8 mol |
| $O_2$ permeability [$10^{-10}$ cm³ (STP)/cm · s cmHg]: | | | 110 |
| Resin D | Precursors: | glycerol 1,3-dimethacrylate | 1 mol |
| | | isocyanatopropyltriethoxysilane | 1 mol |
| | | dimethyldiethoxysilane | 10 mol |
| $O_2$ permeability [$10^{-10}$ cm³ (STP)/cm · s cmHg]: | | | 140 |

Synthesis of Resin B 72.0 g (0.29 mol) of 3-isocyanatopropyltriethoxysilane are added dropwise with cooling to 66.4 g (0.29 mol) of glycerol 1,3-dimethacrylate and dibutyltin dilaurate (as addition catalyst). After 21 h of stirring, 290 ml of ethyl acetate, 258.9 g (1.75 mol) of dimethyldiethoxysilane and 63.3 g of water (including catalyst) are added. After 6 d of stirring, the mixture is subjected to extraction by shaking with water, filtered and concentrated on a rotary evaporator. The volatile constituents are removed completely using an oil pump. Solids content: 95.6%, viscosity after 1 h: 2.2 Pas (25° C.).

Resin variants A, C and D are synthesized by the same procedure.

Example 4
Incorporation of Dimethylsiloxane Structures by Addition Reaction Via Amino End Groups Amino-terminated polydimethylsiloxane DMS A 21 (Gelest) is subjected to an addition reaction by reacting the amino groups with the acrylate groups of the system from trimethylolpropane triacrylate (TMPTA).

| Resin A Precursors: | TMPTA | 1 mol |
|---|---|---|
| | mercaptopropylmethyl-dimethoxysilane | 1 mol |
| | DMS A 21 | 0.03 mol |
| $O_2$ permeability [$10^{-10}$ cm$^3$ (STP)/cm · s cmHg]: | | 19 |
| Resin B Precursors: | TMPTA | 1 mol |
| | mercaptopropylmethyl-dimethoxysilane | 1 mol |
| | DMS A 21 | 0.09 mol |
| $O_2$ permeability [$10^{-10}$ cm$^3$ (STP)/cm · s cmHg]: | | 160 |
| Modulus of elasticity [MPa] | | 210 |
| Flexural strength [MPa] | | 25 |

Example 5
Incorporation of Dimethylsiloxane Structures by Co-addition Polymerization of Acryloyloxy-terminated Polydimethylsiloxane PDMS U22 (ABCR)

The relatively short-chain PDMS U22 from ABCR, containing about 14 polydimethylsiloxane units, is miscible in any proportion.

| Precursors | glycerol 1,3-dimethacrylate | 8 mol |
|---|---|---|
| | 3-isocyanatopropyltriethoxysilane | 8 mol |
| | 1,12-dodecanediol dimethacrylate | 1.6 mol |
| | acryloyloxy-terminated polydimethyl-siloxane PDMS U22 | 1 mol | corresponding to 1.5 DMS units per base unit.

In all cases the resin is found to be spinnable.

All references to publications and filed applications are specifically incorporated by reference in their entireties. Priority documents DE 19841439.0 filed Sep. 10, 1998 and EP 99113689.6 filed Jul. 15, 1999 are specifically incorporated herein by reference in their entireties.

Given the disclosure of the present invention, one versed in the art would readily appreciate that there may be other embodiments and modifications well within the scope and spirit of the present invention. Accordingly, all expedient modifications readily attainable by one versed in the art from the present disclosure within the scope and spirit of the present invention are to be included as further embodiments of the present invention.

Other embodiments of the invention will be apparent to those skilled in the art from consideration of the specification and practice of the invention disclosed herein. It is intended that the specification be considered as exemplary only, with the true scope and spirit of the invention being indicated by the following claims.

We claim:
1. A process for producing an oxygenator membrane, comprising:
(a) preparing a low-viscosity to resinous liquid produced by hydrolytic polycondensation of a material comprising at least one compound selected from the group consisting of:

(i) a compound of formula I

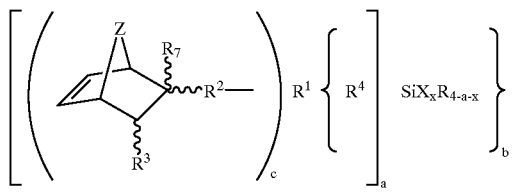

wherein
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
$R^1$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino,
$R^2$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino,
$R^3$=hydrogen, $R^2$—$R^1$—$R^4$—$SiX_xR_{3-x}$, carboxyl, alkyl, alkenyl, aryl, alklaryl or arylalkyl comprising between 1 to 15 carbon atoms, further optionally comprising an atom or group selected from the group consisting of oxygen atom, sulfur atom, ester, carbonyl, carboxyl, amido, and amino,
$R^4$=—$(CHR^6$—$CHR^6)_n$—, where n=0 or 1, —$CHR^6$—$CHR^6$—S—$R^5$—, —COS—$R^5$—, —$CHR^6$—$CHR^6$—$NR^6$—$R^5$—, —Y—CS—NH—$R^5$, —S—$R^5$, —Y—CO—NH—$R^5$—, —C—O—O—$R^5$—, —Y—CO—$C_2H_3$(COOH)—$R^5$, —Y—CO—$C_2H_3$(OH)—$R^5$— or —CO—$NR^6$—$R^5$—,
$R^5$=alkylene, arylene, arylenealkylene or alkylenearylene comprising between 1 to 15 carbon atoms, further optionally comprising an atom or group selected from the group consisting of oxygen atom, sulfur atom, ester, carbonyl, carboxyl, amido, and amino,
$R^6$=hydrogen, alkyl or aryl having 1 to 10 carbon atoms,
$R^7$=hydrogen, alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
X=hydrogen, halogen, hydroxyl, alkoxy, acyloxy, alkylcarbonyl, alkoxycarbonyl or $NR"_2$, where R"=hydrogen, alkyl or aryl,
Y=—O—, —S— or —$NR^6$—,
Z=—O— or $(CHR^6)_m$—, where m=1 or 2,
a=1, 2 or 3, where b=1 if a=2 or 3,
b=1, 2 or 3, where a=1 if b=2 or 3,
c=1 to 6,
x=1, 2 or 3, where a+x=2, 3 or 4;

(ii) a compound of formula II

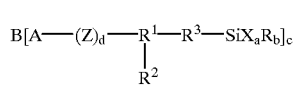
(II)

wherein
B=a straight-chain or branched organic radical having at least one C=C double bond and 4 to 50 carbon atoms,
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
$R^3$=alkylene, arylene, arylenealkylene or alkylenearylene comprising between 0 to 10 carbon atoms, wherein any of these radicals optionally is interrupted by an atom or group selected from the group consisting of oxygen atom, sulfur atom, and amino group,
X=hydrogen, halogen, hydroxyl, alkoxy, acyloxy, alkylcarbonyl, alkoxycarbonyl or $NR''_2$, where R''=hydrogen, alkyl, aryl or alklaryl,
A=O, S or NH if d=1 and Z=CO and
  $R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and
  $R^2$=COOH or H, or
A=O, S, NH or COO if d=1 and Z=CHR', where R'=H, alkyl, aryl or alkylaryl, and
  $R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and
  $R^2$=OH, or
A=O, S, NH or COO if d=0 and
  $R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and
  $R^2$=OH, or
A=S if d=1 and Z=CO and
  $R^1$=N and
  $R^2$=H,
a=1, 2 or 3,
b=0, 1 or 2, where a+b=3,
c=1, 2, 3 or 4;
(iii) a compound of formula III

(III)

wherein
A=O, S, PR'', POR'', NHC(O)O or NHC(O)NR'',
B=a straight-chain or branched organic radical derived from a compound B' having at least one (if c=1 and A=NHC(O)O or NHC(O)NR'') or at least two C=C double bond(s) and 5 to 30 carbon atoms,
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
R'=alkylene, arylene or alkylenearylene,
R''=hydrogen, alkyl, aryl or alkylaryl,
X=hydrogen, halogen, hydroxyl, alkoxy, acyloxy, alkyl arbonyl, alkoxycarbonyl or $NR''_2$,
a=1, 2 or 3,
b=0, 1 or 2,
c=0 or 1,
x=an integer whose maximum value corresponds to the number of double bonds in the compound B' minus 1, or is equal to the number of double bonds in the compound B' if c=1 and A is NHC(O)O or NHC(O)NR'',
wherein said alkyl and alkenyl radicals optionally are substituted straight-chain, branched or cyclic and comprise 1 to 20 carbon atoms, the aryl optionally is a substituted phenyl, naphthyl or biphenylyl, the alkoxy, acyloxy, alkylcarbonyl, alkoxycarbonyl, alkylaryl, arylalkyl, arylene, alkylene and alkylenearyl radical is a derivative of said alkyl or aryl radical; and
(iv) a precondensate derived from a compound shown represented in any of formulae I to III
and wherein said hydrolytic polycondensation material further optionally comprises at least one compound selected from the group consisting of:
(1) a compound of formula V

(V)

wherein
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
X=hydrogen, halogen, hydroxyl, alkoxy, acyloxy, alkylcarbonyl, alkoxycarbonyl or $NR''_2$, where R''=hydrogen, alkyl, aryl or alklylaryl,
a=1, 2 or 3; and
(2) a precondensate derived from a compound of formula V
wherein said hydrolytic polycondensation is conducted by adding a substance selected from the group consisting of water, a solvent, and a condensation catalyst, and wherein said molar ratio of the sum of the compound(s) of formulaes I, II, III and IV to the sum of compound(s) of formula V is between 1:0 and 1:20,
(b) forming a membrane from the said low-viscosity to resinous liquid,
(c) optionally drying the membrane, and
(d) curing the membrane by forming an organic network using a process selected from the group consisting of thermal curing, radiation-induced curing and chemically induced curing.

2. A process as described in claim 1, that further comprises adding to said liquid a substance selected from the group consisting of an addition-copolymerizable monomer, an addition-copolymerizable oligomer and a curing catalyst.

3. The process as claimed in claim 1, that further comprises adding to said liquid at least one monomer or oligomer that is addition-copolymerizable or that can be subjected to a (poly)addition reaction and optionally, addition of at least one curing agent.

4. The process as claimed in claim 3, wherein said membrane is a flat or tubular self-supporting membrane.

5. The process as claimed in claim 4, wherein said membrane is manufactured on a support.

6. The process as claimed in claim 1, wherein said liquid comprises polycondensates derived from at least one compound of formula I, the compound characterized by having a structure according to formula I wherein at least one index of formula I selected from the group consisting of a, b and c has the value 1.

7. The process as claimed in claim 1 wherein said liquid comprises at least one polycondensate derived from at least one compound of formula II or III and wherein radical B has at least one acrylate or methacrylate group.

8. The process as claimed in claim 1, wherein said hydrolytic polycondensation material further comprises at least one compound of formula VI

wherein

E=—CO—NH—, —CS—NH—, —CH$_2$—CH$_2$— or —CH$_2$—CH(OH)—;

R=as defined in claim 1;

R$^5$=alkylene, arylene, arylenealkylene or alkylenearylene comprising between 1 to 15 carbon atoms, wherein optionally one or more radicals is interrupted by an atom or group selected from the group consisting of oxygen atom, sulfur atom, ester, carbonyl, carboxyl, amido, and amino;

R$^6$=alkylene, arylene, arylenealkylene or alkylenearylene comprising between 1 to 15 carbon atoms, wherein optionally one or more radicals is interrupted by an atom or group selected from the group consisting of oxygen atom, sulfur atom, ester, carbonyl, carboxyl, amido, and amino;

X=hydrogen, halogen, hydroxyl, alkoxy, acyloxy, alkylcarbonyl, alkoxycarbonyl or NR''$_2$;

a=1, 2 or 3;

n=2, 3, 4 or 5;

x=1, 2 or 3, where a+x=2, 3 or 4.

9. The process as claimed in claim 1, wherein said hydrolytic polycondensation material further comprises at least one compound selected from the group consisting of a compound according to formula II or III wherein radical B has at least one acrylate or methacrylate group, and a compound according to the formula VI

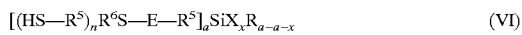

wherein

E=—CO—NH—, —CS—NH—, —CH$_2$—CH$_2$— or —CH$_2$—CH(OH)—;

R=as defined in claim 1;

R$^5$=alkylene, arylene, arylenealkylene or alkylenearylene comprising between 1 to 15 carbon atoms, wherein optionally one or more radicals is interrupted by an atom or group selected from the group consisting of oxygen atom, sulfur atom, ester, carbonyl, carboxyl, amido, and amino;

R$^6$=alkylene, arylene, arylenealkylene or alkylenearylene comprising between 1 to 15 carbon atoms, wherein optionally one or more radicals is interrupted by an atom or group selected from the group consisting of oxygen atom, sulfur atom, ester, carbonyl, carboxyl, amido, and amino;

X=hydrogen, halogen, hydroxyl, alkoxy, acyloxy, alkylcarbonyl, alkoxycarbonyl or NR''$_2$ a=1, 2 or 3;

n=2, 3, 4 or 5;

x=1, 2 or 3, where a+x=2, 3 or 4.

10. The process as claimed in claim 1, wherein said liquid further comprises at least one organic compound selected from the group consisting of a compound having at least one mercapto group, a compound having at least one C=C double bond, and a compound having at least one amino group.

11. The process as claimed in claim 1, wherein said liquid comprises at least one polycondensate or oligocondensate having at least one C=C double bond, the polycondensate or oligocondensate being derived from at least one organically modified and hydrolytically condensable silane.

12. The process as claimed in claim 11, wherein said polycondensate or oligocondensate has at least one amino group and is derived from at least one organically modified, hydrolytically condensable silane.

13. An oxygenator membrane produced by a process as claimed in claim 1.

14. A process of extracorporal membrane oxygenation, wherein said process comprises effecting a separation using the oxygenator membrane as claimed in claim 13.

15. A membrane formed by the process set forth in claim 1, wherein the membrane is self-supporting.

16. A membrane as claimed in claim 15, wherein the membrane has a flat or tubular form.

17. A process for producing a flat or tubular self-supporting oxygenator membrane comprising (a) preparing a low-viscosity to resinous liquid produced by hydrolytic polycondensation of a material comprising at least one compound of the formula IV

wherein

R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, X=hydrogen, halogen, hydroxyl, alkoxy, acyloxy, alkylarbonyl, alkoxycarbonyl or NR''$_2$, where R''=hydrogen, alkyl, aryl or alklaryl, Y=an organic radical having 1 to 30 carbon atoms and 1 to 5 mercapto groups, a=1, 2 or 3, x=1, 2 or 3, where a+x=2, 3 or 4;

optionally together with a precondensate derived from a compound shown represented by the formulae I, II, III and IV and wherein said hydrolytic polycondensation material further optionally comprises at least one compound selected from the group consisting of:

(1) a compound of formula V

wherein

R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, X=hydrogen, halogen, hydroxyl, alkoxy, acyloxy, alkylcarbonyl, alkoxycarbonyl or NR''$_2$, where R''=hydrogen, alkyl, aryl or alklylaryl, a=1, 2 or 3; and (2) a precondensate derived from a compound of formula V wherein said hydrolytic polycondensation is conducted by adding a substance selected from the group consisting of water, a solvent, and a condensation catalyst, and wherein said molar ratio of the sum of the compound(s) of formulae I, II, and III to the sum of compound(s) of formula V is between 1:0 and 1:20, wherein the compound of the formula I is as follows:

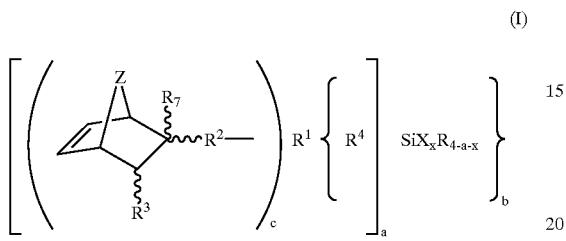

(I)

wherein
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, $R^1$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino, $R^2$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino, $R^3$=hydrogen, $R^2$—$R^1$—$R^4$—$SiX_xR_{3-x}$, carboxyl, alkyl, alkenyl, aryl, alklaryl or arylalkyl comprising between 1 to 15 carbon atoms, further optionally comprising an atom or group selected from the group consisting of oxygen atom, sulfur atom, ester, carbonyl, carboxyl, amido, and amino, $R^4$=—$(CHR^6$—$CHR^6)_n$—, where n=0 or 1, —$CHR^6$—$CHR^6$—S—$R^5$—, —COS—$R^5$—, —$CHR^6$—$CHR^6$—$NR^6$—$R^5$—, —Y—CS—NH—$R^5$, —S—$R^5$, —Y—CO—NH—$R^5$—, —C—O—O—$R^5$—, —Y—CO—$C_2H_3$ (COOH)—$R^5$, —Y—CO—$C_2H_3$(OH)—$R^5$— or —CO—$NR^6$—$R^5$—, $R^5$=alkylene, arylene, arylenealkylene or alkylenearylene comprising between 1 to 15 carbon atoms, further optionally comprising an atom or group selected from the group consisting of oxygen atom, sulfur atom, ester, carbonyl, carboxyl, amido, and amino, $R^6$=hydrogen, alkyl or aryl having 1 to 10 carbon atoms, $R^7$=hydrogen, alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, X=hydrogen, halogen, hydroxyl, alkoxy, acyloxy, alkylcarbonyl, alkoxycarbonyl or $NR''_2$, where R''=hydrogen, alkyl or aryl, Y=—O—, —S— or —$NR^6$—, Z=—O— or $(CHR^6)_m$—, where m=1 or 2, a=1, 2 or 3, where b=1 if a=2 or 3, b=1, 2 or 3, where a=1 if b=2 or 3, c=1 to 6, x=1, 2 or 3, where a+x=2, 3 or 4;

(ii) the compound of formula II is as follows:

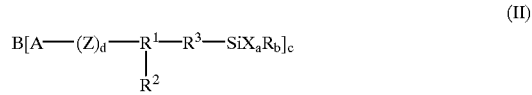

(II)

wherein
B=a straight-chain or branched organic radical having at least one C=C double bond and 4 to 50 carbon atoms, R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, $R^3$=alkylene, arylene, arylenealkylene or alkylenearylene comprising between 0 to 10 carbon atoms, wherein any of these radicals optionally is interrupted by an atom or group selected from the group consisting of oxygen atom, sulfur atom, and amino group, X=hydrogen, halogen, hydroxyl, alkoxy, acyloxy, alkylcarbonyl, alkoxycarbonyl or $NR''_2$, where R''=hydrogen, alkyl, aryl or alklaryl, A=O, S or NH if d=1 and Z=CO and $R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and $R^2$=COOH or H, or A=O, S, NH or COO if d=1 and Z=CHR', where R'=H, alkyl, aryl or alkylaryl, and $R^1$=alkylene, arylene or alkylenearylene comprising between 1 to 10 carbon atoms, wherein any or these radicals optionally is interrupted by an atom or group selected from the group consisting of oxygen atom, sulfur atom, and amino group, and $R^2$=OH, or A=O, S, NH or COO if d=0 and $R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and $R^2$=OH, or A=S if d=1 and Z=CO and $R^1$=N and $R^2$=H, a=1, 2 or 3, b=0, 1 or 2, where a+b=3, c=1, 2, 3 or 4;

(iii) the compound of formula III is as follows:

(III)

wherein

A=O, S, PR", POR", NHC(O)O or NHC(O)NR",

B=a straight-chain or branched organic radical derived from a compound B' having at least one (if c=1 and A=NHC(O)O or NHC(O)NR") or at least two C=C double bond(s) and 5 to 30 carbon atoms, R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, R'=alkylene, arylene or alkylenearylene, R"=hydrogen, alkyl, aryl or alkylaryl, X=hydrogen, halogen, hydroxyl, alkoxy, acyloxy, alkyl arbonyl, alkoxycarbonyl or NR"$_2$, a=1, 2 or 3, b=0, 1 or 2, c=0 or 1, x=an integer whose maximum value corresponds to the number of double bonds in the compound B' minus 1, or is equal to the number of double bonds in the compound B' if c=1 and A is NHC(O)O or NHC(O)NR", wherein said alkyl and alkenyl radicals optionally are substituted straight-chain, branched or cyclic and comprise 1 to 20 carbon atoms, the aryl optionally is a substituted phenyl, naphthyl or biphenylyl, the alkoxy, acyloxy, alkylcarbonyl, alkoxycarbonyl, alkylaryl, arylalkyl, arylene, alkylene and alkylenearyl radical is a derivative of said alkyl or aryl radical (b) forming a membrane from the said low-viscosity to resinous liquid, (c) optionally drying the membrane, and (d) curing the membrane by forming an organic network using a process selected from the group consisting of thermal curing, radiation-induced curing and chemically induced curing in the presence of at least one monomer or oligomer that is addition-copolymerizable or that can be subjected to a (poly)addition reaction.

18. A process for producing an oxygenator membrane, comprising (a) preparing a low-viscosity to resinous liquid produced by hydrolytic polycondensation of a material comprising at least one compound of the formula IV $$Y_aSiX_xR_{4-a-x} \quad (IV)$$

wherein

R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, X=hydrogen, halogen, hydroxyl, alkoxy, acyloxy, alkyl arbonyl, alkoxycarbonyl or NR"$_2$, where R"=hydrogen, alkyl, aryl or alklaryl, Y=an organic radical having 1 to 30 carbon atoms and 1 to 5 mercapto groups, a=1, 2 or 3, x=1, 2 or 3, where a+x=2, 3 or 4;

optionally together with a precondensate derived from a compound shown represented by the formulae I, II, III and IV and wherein said hydrolytic polycondensation material further optionally comprises at least one compound selected from the group consisting of:

(1) a compound of formula V $$X_aSiR_{4-a} \quad (V)$$

wherein

R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, X=hydrogen, halogen, hydroxyl, alkoxy, acyloxy, alkylcarbonyl, alkoxycarbonyl or NR"$_2$, where R"=hydrogen, alkyl, aryl or alklylaryl, a=1, 2 or 3; and (2) a precondensate derived from a compound of formula V wherein said hydrolytic polycondensation is conducted by adding a substance selected from the group consisting of water, a solvent, and a condensation catalyst, and wherein said molar ratio of the sum of the compound(s) of formulae I, II, and III to the sum of compound(s) of formula V is between 1:0 and 1:20, wherein the compound of the formula I is as follows:

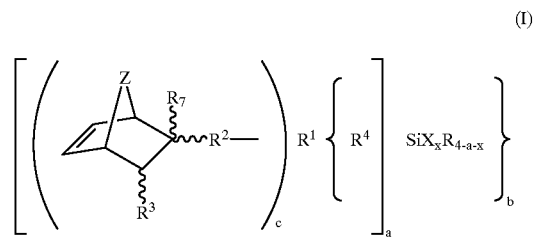

(I)

wherein

R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, $R^1$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino, $R^2$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino, $R^3$=hydrogen, $R^2$—$R^1$—$R^4$—$SiX_xR_{3-x}$, carboxyl, alkyl, alkenyl, aryl, alklaryl or arylalkyl comprising between 1 to 15 carbon atoms, further optionally comprising an atom or group selected from the group consisting of oxygen atom, sulfur atom, ester, carbonyl, carboxyl, amido, and amino, $R^4$=—(CHR$^6$—CHR$^6$)$_n$—, where n=0 or 1, —CHR$^6$—CHR$^6$—S—R$^5$—, —COS—R$^5$—, —CHR$^6$—CHR$^6$—NR$^6$—R$^5$—, —Y—CS—NH—R$^5$, —S—R$^5$, —Y—CO—NH—R$^5$—, —C—O—O—R$^5$—, —Y—CO—C$_2$H$_3$ (COOH)—R$^5$, —Y—CO—C$_2$H$_3$(OH)—R$^5$— or —CO—NR$^6$—R$^5$—, $R^5$=alkylene, arylene, arylenealkylene or alkylenearylene comprising between 1 to 15 carbon atoms, further optionally comprising an atom or group selected from the group consisting of oxygen atom, sulfur atom, ester, carbonyl, carboxyl, amido, and amino, $R^6$=hydrogen, alkyl or aryl having 1 to 10 carbon atoms, $R^7$=hydrogen, alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, X=hydrogen, halogen, hydroxyl, alkoxy, acyloxy, alkylcarbonyl, alkoxycarbonyl or $NR''_2$, where $R''$=hydrogen, alkyl or aryl, Y=—O—, —S— or —$NR^6$—, Z=—O— or $(CHR^6)_m$—, where m=1 or 2, a=1, 2 or 3, where b=1 if a=2 or 3, b=1, 2 or 3, where a=1 if b=2 or 3, c=1 to 6, x=1, 2 or 3, where a+x=2, 3 or 4;

(ii) the compound of formula II is as follows:

$$B[A—(Z)_d—\underset{R^2}{R^1}—R^3—SiX_aR_b]_c \qquad (II)$$

wherein

B=a straight-chain or branched organic radical having at least one C=C double bond and 4 to 50 carbon atoms, R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, $R^3$=alkylene, arylene, arylenealkylene or alkylenearylene comprising between 0 to 10 carbon atoms, wherein any of these radicals optionally is interrupted by an atom or group selected from the group consisting of oxygen atom, sulfur atom, and amino group, X=hydrogen, halogen, hydroxyl, alkoxy, acyloxy, alkylcarbonyl, alkoxycarbonyl or $NR''_2$, where $R''$=hydrogen, alkyl, aryl or alklaryl, A=O,S or NH if d=1 and Z=CO and $R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and $R^2$=COOH or H, or A=O, S, NH or COO if d=1 and Z=CHR', where R'=H, alkyl, aryl or alkylaryl, and $R^1$=alkylene, arylene or alkylenearylene comprising between 1 to 10 carbon atoms, wherein any or these radicals optionally is interrupted by an atom or group selected from the group consisting of oxygen atom, sulfur atom, and amino group, and $R^2$=OH, or A=O, S, NH or COO if d=0 and $R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and $R^2$=OH, or A=S if d=1 and Z=CO and $R^1$=N and $R^2$=H, a=1, 2 or 3, b=0, 1 or 2, where a+b=3, c=1, 2, 3 or 4;

(iii) the compound of formula III is as follows:

$$\{X_aR_bSi[(R^1A)_c]_{4-a-b}\}_xB \qquad (III)$$

wherein

A=O, S, PR'', POR'', NHC(O)O or NHC(O)NR'',

B=a straight-chain or branched organic radical derived from a compound B' having at least one (if c=1 and A=NHC(O)O or NHC(O)NR'') or at least two C=C double bond(s) and 5 to 30 carbon atoms, R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, R'=alkylene, arylene or alkylenearylene, R''=hydrogen, alkyl, aryl or alkylaryl, X=hydrogen, halogen, hydroxyl, alkoxy, acyloxy, alkylarbonyl, alkoxycarbonyl or $NR''_2$, a=1, 2 or 3, b=0, 1 or 2, c=0 or 1, x=an integer whose maximum value corresponds to the number of double bonds in the compound B' minus 1, or is equal to the number of double bonds in the compound B' if c=1 and A is NHC(O)O or NHC(O)NR'', wherein said alkyl and alkenyl radicals optionally are substituted straight-chain, branched or cyclic and comprise 1 to 20 carbon atoms, the aryl optionally is a substituted phenyl, naphthyl or biphenylyl, the alkoxy, acyloxy, alkylcarbonyl, alkoxycarbonyl, alkylaryl, arylalkyl, arylene, alkylene and alkylenearyl radical is a derivative of said alkyl or aryl radical (b) forming a membrane from the said low-viscosity to resinous liquid, (c) optionally drying the membrane, and (d) curing the membrane by forming an organic network using a process selected from the group consisting of thermal curing, radiation-induced curing and chemically induced curing in the presence of additives which are addition-copolymerizable and/or can be subjected to an addition and/or polyaddition reaction;

wherein said hydrolytic polycondensation material further comprises at least one compound of formula VI $$[(HS—R^5)_nR^6—S—E—R^5]_aSiX_xR_{4-a-x} \qquad (VI)$$

wherein

E=—CO—NH—, —CS—NH—, —$CH_2$—$CH_2$— or —$CH_2$—CH(OH)—;

R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, $R^5$=alkylene, arylene, arylenealkylene or alkylenearylene comprising between 1 to 15 carbon atoms, wherein optionally one or more radicals is interrupted by an atom or group selected from the group consisting of oxygen atom, sulfur atom, ester, carbonyl, carboxyl, amido, and amino;

$R^6$=alkylene, arylene, arylenealkylene or alkylenearylene comprising between 1 to 15 carbon atoms, wherein optionally one or more radicals is interrupted by an atom or group selected from the group consisting of oxygen atom, sulfur atom, ester, carbonyl, carboxyl, amido, and amino;

X=hydrogen, halogen, hydroxyl, alkoxy, acyloxy, alkylcarbonyl, alkoxycarbonyl or $NR''_2$;

a=1, 2 or 3;

n=2, 3, 4 or 5;

x=1, 2 or 3, where a+x=2, 3 or 4.

19. A membrane formed by the process set forth in claim 18, wherein the membrane is self-supporting.

20. The membrane as claimed in claim 19, wherein the membrane has a flat or tubular form.

21. A process for producing an oxygenator membrane, comprising (a) preparing a low-viscosity to resinous liquid produced by hydrolytic polycondensation of a material comprising at least one compound of the formula IV

 (IV)

wherein

R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, X=hydrogen, halogen, hydroxyl, alkoxy, acyloxy, alkyl arbonyl, alkoxycarbonyl or $NR''_2$, where R''=hydrogen, alkyl, aryl or alklaryl, Y=an organic radical having 1 to 30 carbon atoms and 1 to 5 mercapto groups, a=1, 2 or 3, x=1, 2 or 3, where a+x=2, 3 or 4;

optionally together with a precondensate derived from a compound shown represented by the formulae I, II, III and IV and wherein said hydrolytic polycondensation material further optionally comprises at least one compound selected from the group consisting of:

(1) a compound of formula V

 (V)

wherein

R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, X=hydrogen, halogen, hydroxyl, alkoxy, acyloxy, alkylcarbonyl, alkoxycarbonyl or $NR''_2$, where R''=hydrogen, alkyl, aryl or alklylaryl, a=1, 2 or 3; and (2) a precondensate derived from a compound of formula V wherein said hydrolytic polycondensation is conducted by adding a substance selected from the group consisting of water, a solvent, and a condensation catalyst, and wherein said molar ratio of the sum of the compound(s) of formulae I, II, and III to the sum of compound(s) of formula V is between 1:0 and 1:20, wherein the compound of the formula I is as follows:

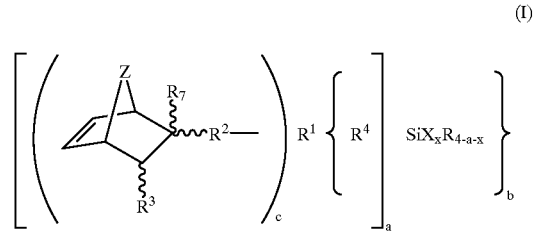 (I)

wherein

R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, $R^1$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino, $R^2$=alkylene, arylene, arylenealkylene or alkylenearylene comprising between 0 to 15 carbon atoms, further optionally comprising an atom or group selected from the group consisting of oxygen atom, sulfur atom, ester, carbonyl, carboxyl, amido, and amino, $R^3$=hydrogen, $R^2-R^1-R^4-SiX_xR_{3-x}$, carboxyl, alkyl, alkenyl, aryl, alklaryl or arylalkyl comprising between 1 to 15 carbon atoms, further optionally comprising an atom or group selected from the group consisting of oxygen atom, sulfur atom, ester, carbonyl, carboxyl, amido, and amino, $R^4$=—$(CHR^6$—$CHR^6)_n$—, where n=0 or 1, —$CHR^6$—$CHR^6$—S—$R^5$—, —COS—$R^5$—, —$CHR^6$—$CHR^6$—$NR^6$—$R^5$—, —Y—CS—NH—$R^5$, —S—$R^5$, —Y—CO—NH—$R^5$—, —C—O—O—$R^5$—, —Y—CO—$C_2H_3$ (COOH)—$R^5$, —Y—CO—$C_2H_3$(OH)—$R^5$— or —CO—$NR^6$—$R^5$—, $R^5$=alkylene, arylene, arylenealkylene or alkylenearylene comprising between 1 to 15 carbon atoms, further optionally comprising an atom or group selected from the group consisting of oxygen atom, sulfur atom, ester, carbonyl, carboxyl, amido, and amino, $R^6$=hydrogen, alkyl or aryl having 1 to 10 carbon atoms, $R^7$=hydrogen, alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino, X=hydrogen, halogen, hydroxyl, alkoxy, acyloxy, alkylcarbonyl, alkoxycarbonyl or $NR''_2$, where R''=hydrogen, alkyl or aryl, Y=—O—, —S— or —$NR^6$—, Z=—O— or $(CHR^6)_m$—, where m=1 or 2, a=1, 2 or 3, where b=1 if a=2 or 3, b=1, 2 or 3, where a=1 if b=2 or 3, c=1 to 6, x=1, 2 or 3, where a+x=2, 3 or 4;

(ii) the compound of formula II is as follows:

(II)

wherein
B=a straight-chain or branched organic radical having at least one C=C double bond and 4 to 50 carbon atoms,
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
$R^3$=alkylene, arylene, arylenealkylene or alkylenearylene comprising between 0 to 10 carbon atoms, wherein any of these radicals optionally is interrupted by an atom or group selected from the group consisting of oxygen atom, sulfur atom, and amino group,
X=hydrogen, halogen, hydroxyl, alkoxy, acyloxy, alkylcarbonyl, alkoxycarbonyl or $NR''_2$, where R''=hydrogen, alkyl, aryl or alklaryl,
A=O, S or NH if d=1 and Z=CO and
$R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and
$R^2$=COOH or H, or
A=O, S, NH or COO if d=1 and Z=CHR', where R'=H, alkyl, aryl or alkylaryl, and
$R^1$=alkylene, arylene or alkylenearylene comprising between 1 to 10 carbon atoms, wherein any or these radicals optionally is interrupted by an atom or group selected from the group consisting of oxygen atom, sulfur atom, and amino group, and
$R^2$=OH, or
A=O, S, NH or COO if d=0 and
$R^1$=alkylene, arylene or alkylenearylene comprising between 1 to 10 carbon atoms, wherein any of these radicals optionally is interrupted by an atom or group selected from the group consisting of oxygen atom, sulfur atom, and amino group, and
$R^2$=OH, or
A=S if d=1 and Z=CO and
$R^1$=N and
$R^2$=H,
a=1, 2 or 3,
b=0, 1 or 2, where a+b=3,
c=1, 2, 3 or 4;
(iii) the compound of formula III is as follows:

$$\{X_aR_bSi[(R^1A)_c]_{4-a-b}\}_xB$$ (III)

wherein
A=O, S, PR'', POR'', NHC(O)O or NHC(O)NR'',
B=a straight-chain or branched organic radical derived from a compound B' having at least one (if c=1 and A=NHC(O)O or NHC(O)NR'') or at least two C=C double bond(s) and 5 to 30 carbon atoms,
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino,
R'=alkylene, arylene or alkylenearylene,
R''=hydrogen, alkyl, aryl or alkylaryl, X=hydrogen, halogen, hydroxyl, alkoxy, acyloxy, alkyl arbonyl, alkoxycarbonyl or $NR''_2$,
a=1, 2 or 3,
b=0, 1 or 2,
c=0 or 1,
x=an integer whose maximum value corresponds to the number of double bonds in the compound B' minus 1, or is equal to the number of double bonds in the compound B' if c=1 and A is NHC(O)O or NHC(O)NR'',
wherein said alkyl and alkenyl radicals optionally are substituted straight-chain, branched or cyclic and comprise 1 to 20 carbon atoms, the aryl optionally is a substituted phenyl, naphthyl or biphenylyl, the alkoxy, acyloxy, alkylcarbonyl, alkoxycarbonyl, alkylaryl, arylalkyl, arylene, alkylene and alkylenearyl radical is a derivative of said alkyl or aryl radical
(b) forming a membrane from the said low-viscosity to resinous liquid,
(c) optionally drying the membrane, and
(d) curing the membrane by forming an organic network using a process selected from the group consisting of thermal curing, radiation-induced curing and chemically induced curing in the presence of additives which are addition-copolymerizable and/or can be subjected to an addition and/or polyaddition reaction;
wherein said hydrolytic polycondensation material comprises at least one compound selected from the group consisting of a compound according to formula II or III wherein radical B has at least one acrylate or methacrylate group, and a compound according to the formula VI

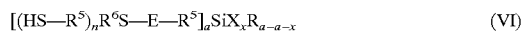

(VI)

wherein
E=—CO—NH—, —CS—NH—, —$CH_2$—$CH_2$— or —$CH_2$—CH(OH)—;
R=alkyl, alkenyl, aryl, alkylaryl or arylalkyl comprising between 1 to 15 carbon atoms, further optionally comprising an atom or group selected from the group consisting of oxygen atom, sulfur atom, ester, carbonyl, carboxyl, amido, and amino;
$R^5$=alkylene, arylene, arylenealkylene or alkylenearylene comprising between 1 to 15 carbon atoms, wherein optionally one or more radicals is interrupted by an atom or group selected from the group consisting of oxygen atom, sulfur atom, ester, carbonyl, carboxyl, amido, and amino;
$R^6$=alkylene, arylene, arylenealkylene or alkylenearylene comprising between 1 to 15 carbon atoms, wherein optionally one or more radicals is interrupted by an atom or group selected from the group consisting of oxygen atom, sulfur atom, ester, carbonyl, carboxyl, amido, and amino;
X=hydrogen, halogen, hydroxyl, alkoxy, acyloxy, alkylcarbonyl, alkoxycarbonyl or $NR''_2$
a=1, 2 or 3;
n=2, 3, 4 or 5;
x=1, 2 or 3, where a+x=2, 3 or 4.
22. A membrane formed by the process set forth in as claimed in claim 21, wherein the membrane is self-supporting.
23. The membrane as claimed in claim 22, wherein the membrane has a flat or tubular form.

* * * * *